United States Patent
Yang et al.

(10) Patent No.: US 12,120,750 B2
(45) Date of Patent: *Oct. 15, 2024

(54) METHOD AND DEVICE FOR TRANSMITTING/RECEIVING WIRELESS SIGNAL IN WIRELESS COMMUNICATION SYSTEM

(71) Applicant: LG Electronics Inc., Seoul (KR)

(72) Inventors: Suckchel Yang, Seoul (KR); Joonkui Ahn, Seoul (KR); Hanjun Park, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/954,819

(22) Filed: Sep. 28, 2022

(65) Prior Publication Data
US 2023/0026196 A1 Jan. 26, 2023

Related U.S. Application Data

(63) Continuation of application No. 17/566,013, filed on Dec. 30, 2021, now Pat. No. 11,723,077, which is a
(Continued)

(51) Int. Cl.
*H04W 74/0833* (2024.01)
*H04B 7/06* (2006.01)
(Continued)

(52) U.S. Cl.
CPC ...... *H04W 74/0833* (2013.01); *H04B 7/0626* (2013.01); *H04L 1/18* (2013.01);
(Continued)

(58) Field of Classification Search
CPC ............ H04W 74/0833; H04W 72/04; H04W 72/0446; H04W 72/12; H04W 72/20;
(Continued)

(56) References Cited

U.S. PATENT DOCUMENTS

2004/0093548 A1 5/2004 Heo et al.
2012/0087349 A1* 4/2012 Zhu ................. H04L 1/0029
370/336
(Continued)

FOREIGN PATENT DOCUMENTS

KR 20120055452 5/2012
KR 20120134019 12/2012
(Continued)

OTHER PUBLICATIONS

"3rd Generation Partnership Project; Technical Specification Group Radio Access Network; Evolved Universal Terrestrial Radio Access (E-UTRA); Physical layer procedures (Release 8)," 3GPP TS 36.213 V8.8.0 (Sep. 2009), 77 * pages.
(Continued)

*Primary Examiner* — Mang Hang Yeung
(74) *Attorney, Agent, or Firm* — Fish & Richardson P.C.

(57) ABSTRACT

The present invention relates to a wireless communication system, and specifically, to a method and a device for the method which comprises the steps of: receiving a PDCCH including uplink scheduling information; and transmitting, at a UL SF, a PUSCH indicated by the uplink scheduling information, wherein, if the PDCCH requests a transmission of an ACK, the PUSCH includes ACK information about a SF set corresponding to the UL SF, wherein the SF set includes a plurality of SFs.

18 Claims, 12 Drawing Sheets

Related U.S. Application Data continuation of application No. 16/747,774, filed on Jan. 21, 2020, now Pat. No. 11,234,274, which is a continuation of application No. 16/074,599, filed as application No. PCT/KR2017/001157 on Feb. 2, 2017, now Pat. No. 10,548,169.

(60) Provisional application No. 62/437,040, filed on Dec. 20, 2016, provisional application No. 62/353,117, filed on Jun. 22, 2016, provisional application No. 62/331,481, filed on May 4, 2016, provisional application No. 62/327,431, filed on Apr. 25, 2016, provisional application No. 62/319,295, filed on Apr. 7, 2016, provisional application No. 62/309,972, filed on Mar. 18, 2016, provisional application No. 62/289,938, filed on Feb. 2, 2016.

(51) Int. Cl.

| | | |
|---|---|---|
| *H04L 1/18* | (2023.01) | |
| *H04L 1/1812* | (2023.01) | |
| *H04L 1/1829* | (2023.01) | |
| *H04L 1/1867* | (2023.01) | |
| *H04L 5/00* | (2006.01) | |
| *H04L 25/02* | (2006.01) | |
| *H04W 72/04* | (2023.01) | |
| *H04W 72/0446* | (2023.01) | |
| *H04W 72/12* | (2023.01) | |
| *H04W 72/20* | (2023.01) | |
| *H04W 72/23* | (2023.01) | |
| *H04W 76/27* | (2018.01) | |
| *H04W 76/28* | (2018.01) | |
| *H04L 1/1607* | (2023.01) | |

(52) U.S. Cl.
CPC .......... *H04L 1/1812* (2013.01); *H04L 1/1861* (2013.01); *H04L 1/1864* (2013.01); *H04L 1/1887* (2013.01); *H04L 5/0044* (2013.01); *H04L 5/0048* (2013.01); *H04L 5/0053* (2013.01); *H04L 5/0055* (2013.01); *H04L 25/0224* (2013.01); *H04W 72/04* (2013.01); *H04W 72/0446* (2013.01); *H04W 72/12* (2013.01); *H04W 72/20* (2023.01); *H04W 72/23* (2023.01); *H04W 76/27* (2018.02); *H04W 76/28* (2018.02); *H04L 1/1664* (2013.01)

(58) Field of Classification Search
CPC ..... H04W 72/23; H04W 76/27; H04W 76/28; H04B 7/0626; H04L 1/18; H04L 1/1812; H04L 1/1861; H04L 1/1864; H04L 1/1887; H04L 5/0044; H04L 5/0048; H04L 5/0053; H04L 5/0055; H04L 25/0224; H04L 1/1664

USPC ......................................................... 370/329

See application file for complete search history.

(56) References Cited

U.S. PATENT DOCUMENTS

| | | | |
|---|---|---|---|
| 2012/0106517 | A1 | 5/2012 | Charbit et al. |
| 2012/0113831 | A1* | 5/2012 | Pelletier ............... H04L 5/0053 370/252 |
| 2012/0236812 | A1* | 9/2012 | Chen .................... H04W 72/23 370/329 |
| 2013/0051254 | A1 | 2/2013 | Wilhelmsson et al. |
| 2014/0003326 | A1 | 1/2014 | Nishio et al. |
| 2014/0029535 | A1 | 1/2014 | Medapalli |
| 2014/0029565 | A1 | 1/2014 | Kim et al. |
| 2014/0153452 | A1 | 6/2014 | Son et al. |
| 2014/0286276 | A1 | 9/2014 | Lunttila et al. |
| 2015/0237619 | A1 | 8/2015 | Yang et al. |
| 2017/0085344 | A1 | 3/2017 | Yang |
| 2017/0367058 | A1 | 12/2017 | Pelletier et al. |
| 2018/0076924 | A1* | 3/2018 | Lee ........................ H04L 5/0094 |
| 2019/0090219 | A1 | 3/2019 | Lee et al. |

FOREIGN PATENT DOCUMENTS

| | | |
|---|---|---|
| KR | 2013051473 | 5/2013 |
| KR | 20140001171 | 1/2014 |
| KR | 20140004242 | 1/2014 |
| KR | 20140034803 | 3/2014 |

OTHER PUBLICATIONS

Extended European Search Report in European Application No. 17747758.5, dated Sep. 12, 2019, 9 pages.
Intel Corporation, "UCI and DL HARQ-ACK feedback for NB-IoT," R1-160416, 3GPP TSG RAN WG1 Meeting #84, St Julian's, Malta, Feb. 16-19, 2016, 6 pages.
KT Corp., "Considerations on DL HARQ ACK/NACK feedback for NB-IoT," R1-161080, 3GPP TSG RAN WG1 Meeting #84, St Julian's, Malta, Feb. 15-19, 2016, 2 pages.
Office Action in European Appln. No. 17747758.5, dated Aug. 18, 2021, 7 pages.
ZTE, "Issues about data transmission in TDD-eIMTA," R1-132108, 3GPP TSG RAN WG1 Meeting #73, Fukuoka, Japan, May 20-24, 2013, 4 pages.

* cited by examiner

FIG. 14
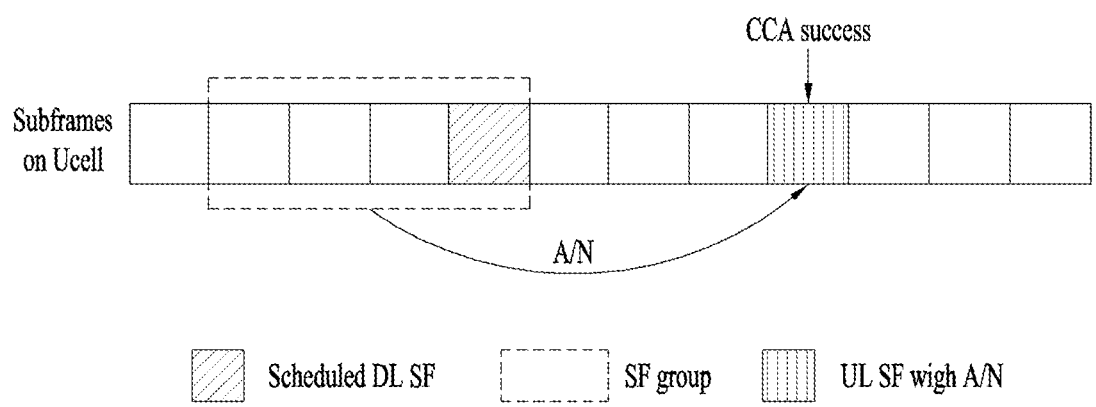
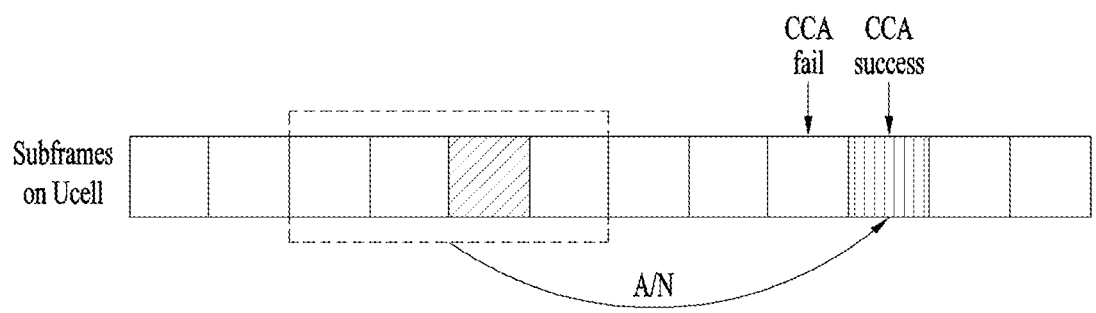

METHOD AND DEVICE FOR TRANSMITTING/RECEIVING WIRELESS SIGNAL IN WIRELESS COMMUNICATION SYSTEM

CROSS REFERENCE TO RELATED APPLICATIONS

This application is a continuation of U.S. application Ser. No. 17/566,013, filed on Dec. 30, 2021, which is a continuation of U.S. application Ser. No. 16/747,774, filed on Jan. 21, 2020, now U.S. Pat. No. 11,234,274, which is a continuation of U.S. application Ser. No. 16/074,599, filed on Aug. 1, 2018, now U.S. Pat. No. 10,548,169, which is a National Phase of PCT/KR2017/001157, filed on Feb. 2, 2017, which claims priority under 35 U.S.C. § 119(e) to U.S. Provisional Application Nos. 62/289,938; 62/309,972; 62/319,295; 62/327,431; 62/331,481; 62/353,117; and 62/437,040 filed respectively on Feb. 2, 2016; Mar. 18, 2016; Apr. 7, 2016; Apr. 25, 2016; May 4, 2016; Jun. 22, 2016; and Dec. 20, 2016, all of which are hereby expressly incorporated by reference into the present application.

TECHNICAL FIELD

The present invention relates to a wireless communication system, and more particularly, to a method and apparatus for transmitting/receiving a wireless signal. The wireless communication system includes a CA-based (Carrier Aggregation-based) wireless communication system.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

SUMMARY

An object of the present invention is to provide a method of efficiently transmitting/receiving control information in a wireless communication and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

In one aspect of the present invention, there is provided a method of performing communication by a UE in a wireless communication system, including: receiving a physical downlink control channel (PDCCH) including uplink scheduling information; and transmitting, in an uplink subframe (UL SF), a physical uplink shared channel (PUSCH) indicated by the uplink scheduling information, wherein, if the PDCCH requests ACK transmission, the PUSCH includes ACK information about an SF set corresponding to the UL SF, the SF set including a plurality of SFs.

In another aspect of the present invention, there is provided a UE used in a wireless communication system, including a radio frequency (RF) module and a processor, wherein the processor is configured to receive a PDCCH including uplink scheduling information and to transmit, in a UL SF, a PUSCH indicated by the uplink scheduling information, wherein, if the PDCCH requests ACK transmission, the PUSCH includes ACK information about an SF set corresponding to the UL SF, the SF set including a plurality of SFs.

Preferably, if the PDCCH does not request ACK transmission, the PUSCH may not include the ACK information about the SF set corresponding to the UL SF.

Preferably, the SF set may include a plurality of consecutive SFs.

Preferably, the SF set may include a plurality of SFs corresponding to a plurality of HARQ process IDs.

Preferably, the SF set may include a plurality of SFs corresponding to a plurality of downlink assignment indices (DAIs).

Preferably, the scheduling information may include scheduling information about a plurality of PUSCHs, the PDCCH may further include ACK request information, and the ACK request information may be applied only to an initially scheduled PUSCH among the plurality of PUSCHs.

Preferably, UL and DL transmission resources may be aperiodically configured in the wireless communication system.

According to the present invention, wireless signal transmission and reception can be efficiently performed in a wireless communication system.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIGS. 14 and 15 illustrate an ACK/NACK transmission procedure according to the present invention.

DETAILED DESCRIPTION

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE. While the following description is given, centering on 3GPP LTE/LTE-A for clarity, this is purely exemplary and thus should not be construed as limiting the present invention.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
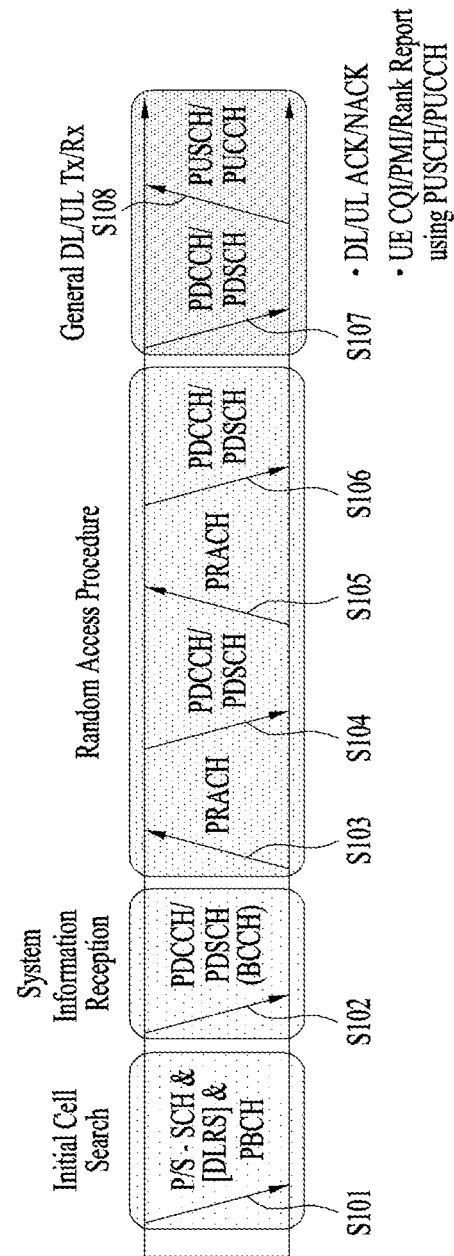
FIG. 1 illustrates physical channels used in 3GPP LTE(-A) and a signal transmission method using the same.

FIG. 1 illustrates physical channels used in 3GPP LTE(-A) and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the mean time, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
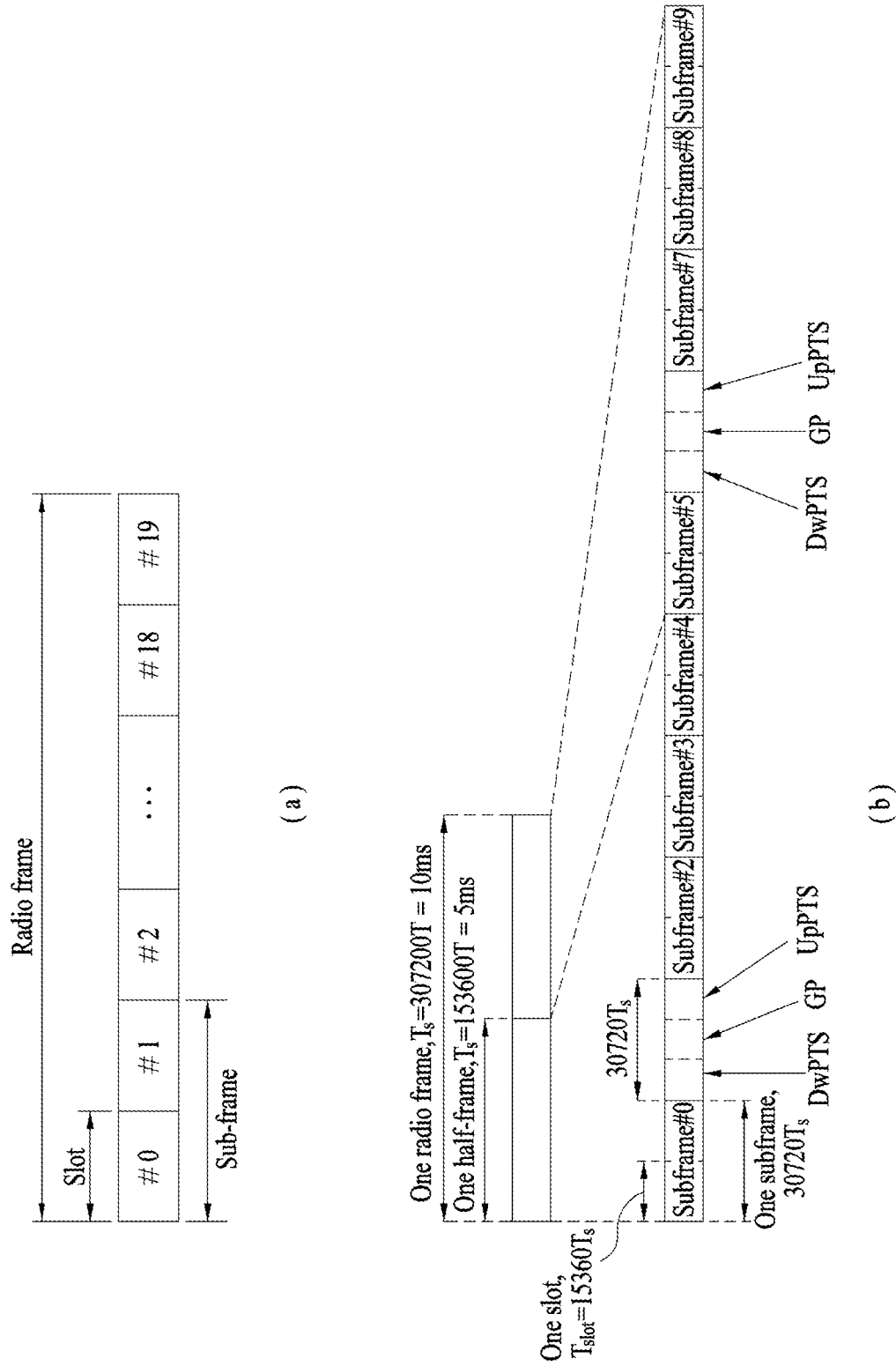
FIG. 2 illustrates a radio frame structure.

FIG. 2 illustrates a radio frame structure. Uplink/downlink data packet transmission is performed on a subframe-by-subframe basis. A subframe is defined as a predetermined time interval including a plurality of symbols. 3GPP LTE supports a type-1 radio frame structure applicable to frequency division duplex (FDD) and a type-2 radio frame structure applicable to time division duplex (TDD).

FIG. 2(*a*) illustrates a type-1 radio frame structure. A downlink subframe includes 10 subframes each of which includes 2 slots in the time domain. A time for transmitting a subframe is defined as a transmission time interval (TTI). For example, each subframe has a duration of 1 ms and each slot has a duration of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(*b*) illustrates a type-2 radio frame structure. The type-2 radio frame includes 2 half frames. Each half frame includes 4(5) normal subframes and 10 special subframes. The normal subframes are used for uplink or downlink according to UL-DL configuration. A subframe is composed of 2 slots.

Table 1 shows subframe configurations in a radio frame according to UL-DL configurations.

TABLE 1

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE and UpPTS is used for channel estimation in a BS and uplink transmission synchronization in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
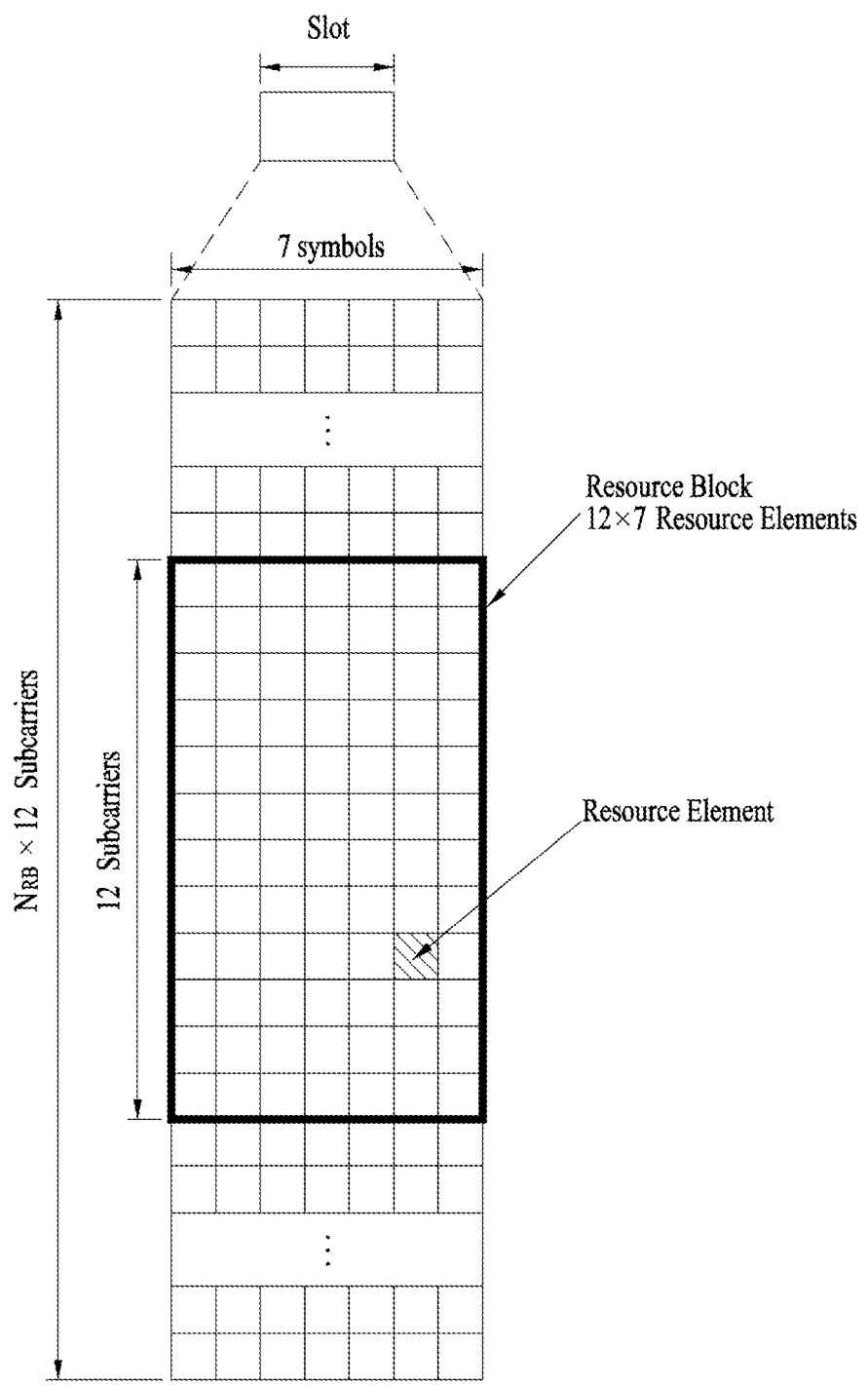
FIG. 3 illustrates a resource grid of a downlink slot.

FIG. 3 illustrates a resource grid of a downlink slot.

Referring to FIG. 3, a downlink slot includes a plurality of OFDM symbols in the time domain. While one downlink slot may include 7 OFDM symbols and one resource block (RB) may include 12 subcarriers in the frequency domain in the figure, the present invention is not limited thereto. Each element on the resource grid is referred to as a resource element (RE). One RB includes 12×7 REs. The number NRB of RBs included in the downlink slot depends on a downlink transmit bandwidth. The structure of an uplink slot may be same as that of the downlink slot.

Figure 4:
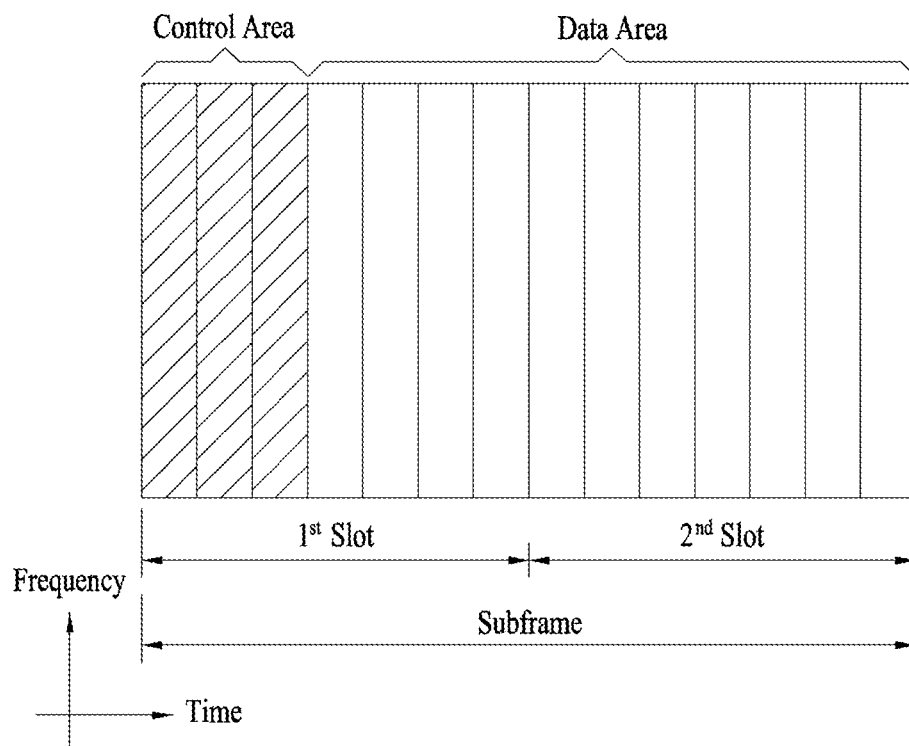
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is an RB. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries a HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UE group.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. Information field type, the number of information fields, the number of bits of each information field, etc. depend on DIC format. For example, the DCI formats selectively include information such as hopping flag, RB assignment, MCS (Modulation Coding Scheme), RV (Redundancy Version), NDI (New Data Indicator), TPC (Transmit Power Control), HARQ process number, PMI (Precoding Matrix Indicator) confirmation as necessary. Accordingly, the size of control information matched to a DCI format depends on the DCI format. An arbitrary DCI format may be used to transmit two or more types of control information. For example, DIC formats 0/1A is used to carry DCI format 0 or DIC format 1, which are discriminated from each other using a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI which includes resource assignment information and other control information for a UE or UE group. In general, a plurality of PDCCHs can be transmitted in a subframe. Each PDCCH is transmitted using one or more CCEs. Each CCE corresponds to 9 sets of 4 REs. The 4 REs are referred to as an REG. 4 QPSK symbols are mapped to one REG. REs allocated to a reference signal are not included in an REG, and thus the total number of REGs in OFDM symbols depends on presence or absence of a cell-specific reference signal. The concept of REG (i.e. group based mapping, each group including 4 REs) is used for other downlink control channels (PCFICH and PHICH). That is, REG is used as a basic resource unit of a control region. 4 PDCCH formats are supported as shown in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 8 | 144 |

TABLE 2-continued

| PDCCH format | Number of CCEs (n) | Number of REGs | Number of PDCCH bits |
|---|---|---|---|
| 2 | 4 | 36 | 288 |
| 3 | 5 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as a search space (SS). In LTE, the SS has a size depending on PDCCH format. A UE-specific search space (USS) and a common search space (CSS) are separately defined. The USS is set per UE and the range of the CSS is signaled to all UEs. The USS and the CSS may overlap for a given UE. In the case of a considerably small SS with respect to a specific UE, when some CCEs positions are allocated in the SS, remaining CCEs are not present. Accordingly, the BS may not find CCE resources on which PDCCHs will be transmitted to available UEs within given subframes. To minimize the possibility that this blocking continues to the next subframe, a UE-specific hopping sequence is applied to the starting point of the USS.

Table 3 shows sizes of the CSS and USS.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Figure 5:
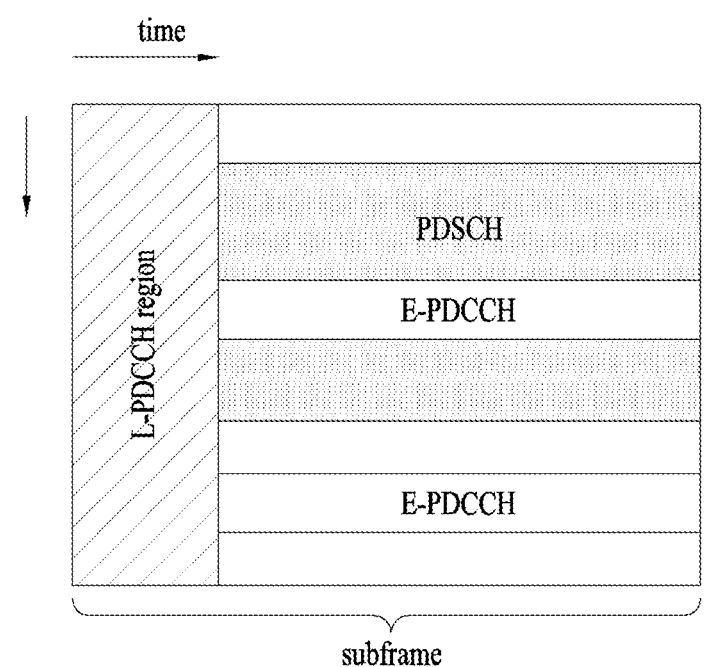
FIG. 5 illustrates an example of an Enhanced Physical Downlink Control Channel (EPDCCH).

Transmission Mode (TM)
 Transmission mode 1: Transmission from a single base station antenna port
 Transmission mode 2: Transmit diversity
 Transmission mode 3: Open-loop spatial multiplexing
 Transmission mode 4: Closed-loop spatial multiplexing
 Transmission mode 5: Multi-user MIMO (Multiple Input Multiple Output)
 Transmission mode 6: Closed-loop rank-1 precoding
 Transmission mode 7: Single-antenna port (port5) transmission
 Transmission mode 8: Double layer transmission (ports 7 and 8) or single-antenna port (port 7 or 8) transmission
 Transmission mode 9: Transmission through up to 8 layers (ports 7 to 14) or single-antenna port (port 7 or 8) transmission DCI Format
 Format 0: Resource grants for PUSCH transmission
 Format 1: Resource assignments for single codeword PDSCH transmission (transmission modes 1, 2 and 7)
 Format 1A: Compact signaling of resource assignments for single codeword PDSCH (all modes)
 Format 1B: Compact resource assignments for PDSCH using rank-1 closed loop precoding (mod 6)
 Format 1C: Very compact resource assignments for PDSCH (e.g. paging/broadcast system information)
 Format 1D: Compact resource assignments for PDSCH using multi-user MIMO (mode 5)
 Format 2: Resource assignments for PDSCH for closed-loop MIMO operation (mode 4)
 Format 2A: Resource assignments for PDSCH for open-loop MIMO operation (mode 3)
 Format 3/3A: Power control commands for PUCCH and PUSCH with 2-bit/1-bit power adjustments FIG. 5 illustrates an EPDCCH. The EPDCCH is a channel additionally introduced in LTE-A.

Referring to FIG. 5, a PDCCH (for convenience, legacy PDCCH or L-PDCCH) according to legacy LTE may be allocated to a control region (see FIG. 4) of a subframe. In the figure, the L-PDCCH region means a region to which a legacy PDCCH may be allocated. Meanwhile, a PDCCH may be further allocated to the data region (e.g., a resource region for a PDSCH). A PDCCH allocated to the data region is referred to as an E-PDCCH. As shown, control channel resources may be further acquired via the E-PDCCH to mitigate a scheduling restriction due to restricted control channel resources of the L-PDCCH region. Similarly to the L-PDCCH, the E-PDCCH carries DCI. For example, the E-PDCCH may carry downlink scheduling information and uplink scheduling information. For example, the UE may receive the E-PDCCH and receive data/control information via a PDSCH corresponding to the E-PDCCH. In addition, the UE may receive the E-PDCCH and transmit data/control information via a PUSCH corresponding to the E-PDCCH. The E-PDCCH/PDSCH may be allocated starting from a first OFDM symbol of the subframe, according to cell type. In this specification, the PDCCH includes both L-PDCCH and EPDCCH unless otherwise noted.

Figure 6:
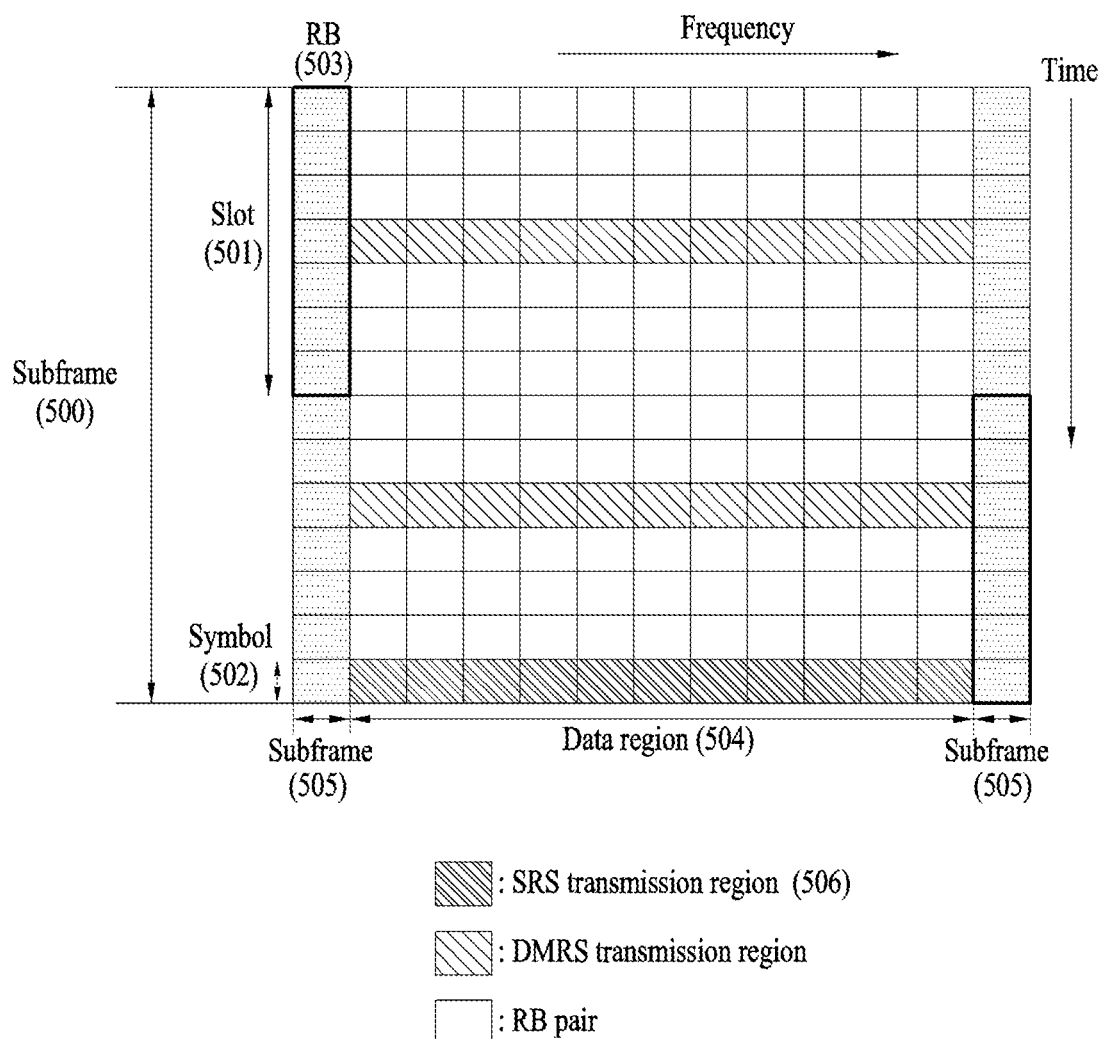
FIG. 6 illustrates the structure of an uplink subframe used in LTE(-A).

FIG. 6 illustrates a structure of an uplink subframe used in LTE(-A).

Referring to FIG. 6, a subframe 500 is composed of two 0.5 ms slots 501. Assuming a length of a normal cyclic prefix (CP), each slot is composed of 7 symbols 502 and one symbol corresponds to one SC-FDMA symbol. A resource block (RB) 503 is a resource allocation unit corresponding to 12 subcarriers in the frequency domain and one slot in the time domain. The structure of the uplink subframe of LTE(-A) is largely divided into a data region 504 and a control region 505. A data region refers to a communication resource used for transmission of data such as voice, a packet, etc. transmitted to each UE and includes a physical uplink shared channel (PUSCH). A control region refers to a communication resource for transmission of an uplink control signal, for example, downlink channel quality report from each UE, reception ACK/NACK for a downlink signal, uplink scheduling request, etc. and includes a physical uplink control channel (PUCCH). A sounding reference signal (SRS) is transmitted through an SC-FDMA symbol that is lastly positioned in the time axis in one subframe. SRSs of a plurality of UEs, which are transmitted to the last SC-FDMAs of the same subframe, can be differentiated according to frequency positions/sequences. The SRS is used to transmit an uplink channel state to an eNB and is periodically transmitted according to a subframe period/offset set by a higher layer (e.g., RRC layer) or aperiodically transmitted at the request of the eNB.

Next, HARQ (Hybrid Automatic Repeat reQuest) will be described. When a plurality of UEs has data to be transmitted on uplink/downlink in a wireless communication, an eNB selects UEs which will transmit data per transmission time internal (TTI) (e.g., subframe). In a system using multiple carriers and the like, an eNB selects UEs which will transmit data on uplink/downlink per TTI and also selects a frequency band to be used for data transmission of the corresponding UEs.

When description is based on uplink (UL), UEs transmit reference signals (or pilot signals) on uplink and an eNB detects channel states of the UEs using the reference signals transmitted from the UEs and selects UEs which will transmit data on uplink in each unit frequency band per TTI. The eNB notifies the UEs of the result of selection. That is, the eNB transmits, to UL scheduled UEs, a UL assignment message indicating that the UEs may transmit data using a specific frequency band in a specific TTI. The UL assignment message is also referred to as a UL grant. The UEs transmit data on uplink according to the UL assignment message. The UL assignment message may include UE identity (ID), RB allocation information, a modulation and coding scheme (MCS), a redundancy version (RV), new data indication (NDI) and the like.

In the case of a synchronous non-adaptive HARQ method, a retransmission time is appointed in the system (e.g., after 4 subframes from a NACK reception time). Accordingly, the eNB may send a UL grant message to UEs only in initial transmission and subsequent retransmission is performed according to an ACK/NACK signal (e.g., PHICH signal). On the other hand, in the case of an asynchronous adaptive HARQ method, a retransmission time is not appointed and thus the eNB needs to send a retransmission request message to UEs. Further, the retransmission request message may include UE ID, RB allocation information, HARQ process ID/number, RV and NDI information because frequency resources or an MCS for retransmission vary with transmission time.

Figure 7:
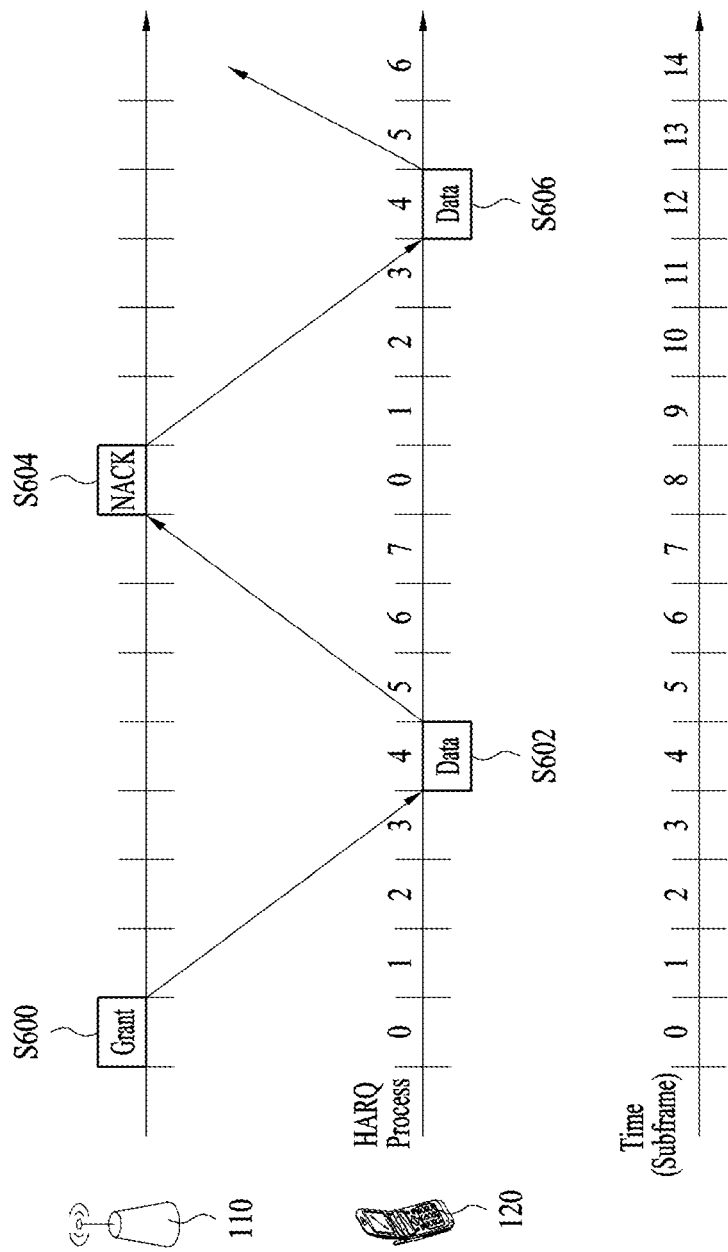
FIG. 7 illustrates UL HARQ (Uplink Hybrid Automatic Repeat reQuest) operation.

FIG. 7 illustrates a UL HARQ operation in an LTE(-A) system. In the LTE(-A) system, the asynchronous adaptive HARQ method is used as a UL HARQ method. When 8-channel HARQ is used, 0 to 7 are provided as HARQ process numbers. One HARQ process operates per TTI (e.g., subframe). Referring to FIG. 7, a UL grant is transmitted to a UE 120 through a PDCCH (S600). The UE 120 transmits UL data to an eNB 110 after 4 subframes from the time (e.g., subframe 0) at which the UL grant is received using an RB and an MCS designated by the UL grant (S602). The eNB 110 decodes the UL data received from the UE 120 and then generates ACK/NACK. When decoding of the UL data fails, the eNB 110 transmits NACK to the UE 120 (S604). The UE 120 retransmits the UL data after 4 subframes from the time at which NACK is received (S606). Initial transmission and retransmission of the UL data are performed through the same HARQ process (e.g., HARQ process 4). ACK/NACK information may be transmitted through a PHICH.

With respect to TDD cells, the following problem may be generated when a UE transmits an ACK/NACK signal to a base station. When the UE misses some of PDCCHs transmitted by the base station for a period of a plurality of subframes, the UE cannot be aware of the fact that PDSCHs corresponding to the missed PDCCHs have been transmitted thereto and thus an error may be generated in generation of ACK/NACK.

To solve this, a DL grant PDCCH/SPS release PDCCH for TDD cells includes a DAI field (i.e., DL DAI field). The value of the DL DAI field indicates a cumulative value (i.e., counting value) of PDCCHs corresponding to PDSCHs and PDCCHs indicating downlink SPS release up to the current subframe in n-k (k⊂K) DL subframes corresponding to a UL subframe carrying ACK/NACK. The in n-k (k⊂K) DL subframes refer to DL subframes corresponding to a UL subframe carrying ACK/NACK. For example, when three DL subframes correspond to a single UL subframe, PDSCHs transmitted in the period of the three DL subframes are sequentially indexed (i.e., sequentially counted) and transmitted in a PDCCH which schedules the PDSCHs. The UE can recognize whether a previous PDCCH has been successfully received through DAI information included in the PDCCH.

Figure 8:
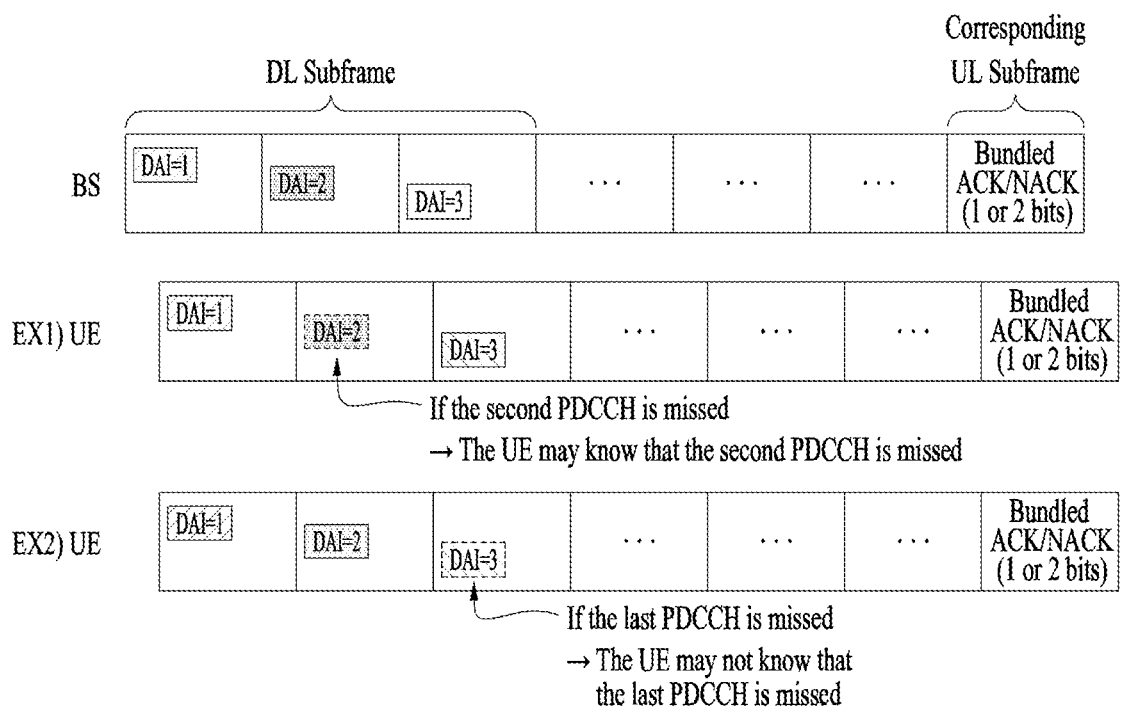
FIG. 8 illustrates a method of performing an ACK/NACK transmission procedure using a DAI (Downlink Assignment Index).

FIG. 8 illustrates ACK/NACK transmission using a DL DAI. This example is based on the assumption that a TDD system has a configuration of 3 DL subframes: 1 UL subframe. It is assumed that a UE transmits ACK/NACK using a PUSCH resource for convenience. When ACK/NACK is transmitted through a PUSCH in LTE, 1-bit or 2-bit bundled ACK/NACK is transmitted.

Referring to FIG. 8, when the second PDCCH is missed as in the first example (EX 1), the UE can recognize that the second PDCCH is missed because the DL DAI value of the third PDCCH differs from the number of PDCCHs detected so far. In this case, the UE may process an ACK/NACK response to the second PDCCH as NACK (or NACK/DTX). When the last PDCCH is missed as in the second example (EX 2), the UE may not know that the last PDCCH is missed because the DAI value of the finally detected PDDCH corresponds to the number of PDCCHs detected so far (i.e., DTX). Accordingly, the UE recognizes that only two PDCCHs have been scheduled for the DL subframe period. In this case, the UE bundles only ACK/NACK corresponding to the first two PDCCHs, causing generation of an error in an ACK/NACK feedback procedure. To solve this, a UL grant PDCCH also includes a DAI field (i.e., UL DAI field). The UL DAI field is a 2-bit field and indicates information about the number of scheduled PDCCHs.

Figure 9:
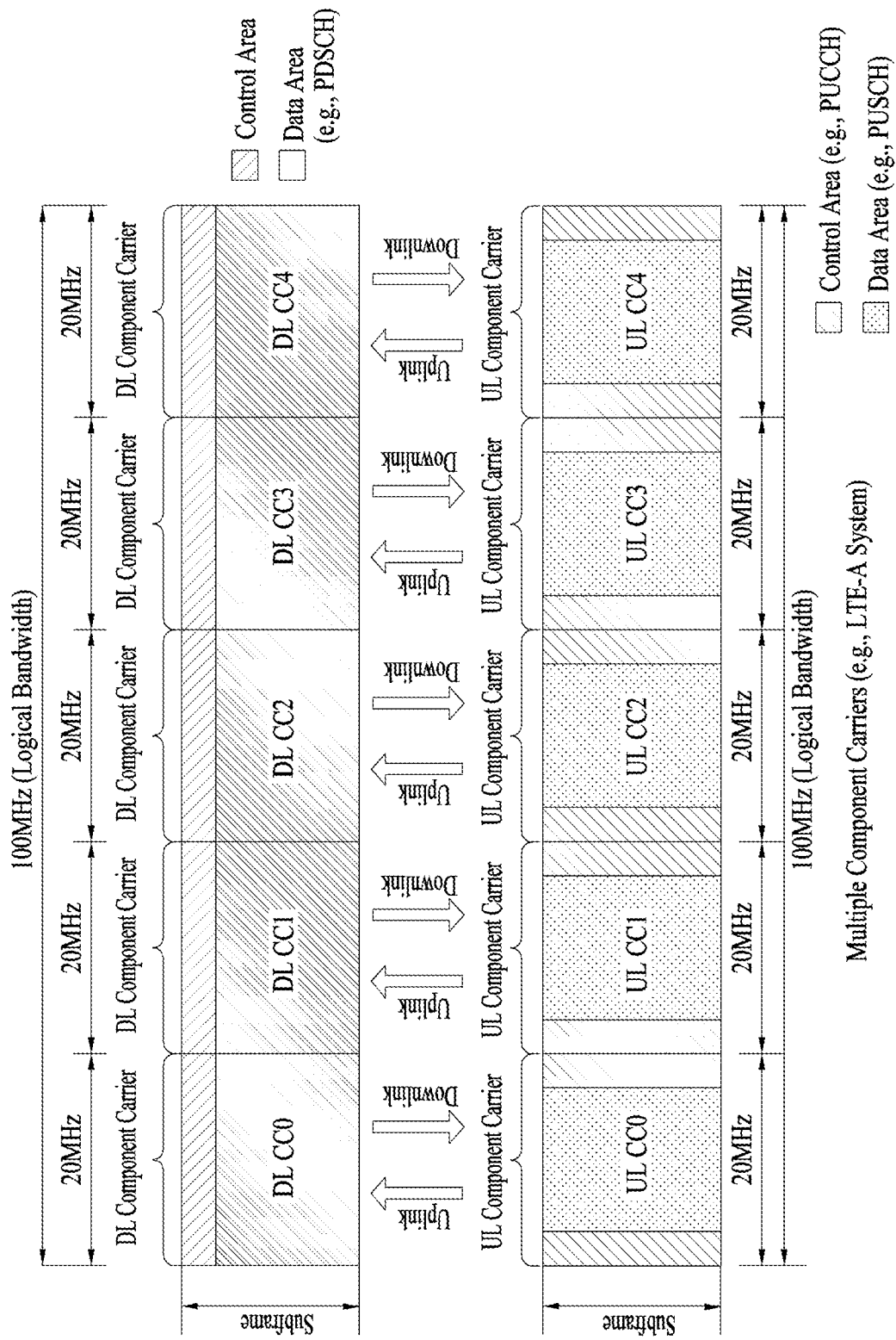
FIG. 9 illustrates a carrier aggregation (CA)-based wireless communication system.

FIG. 9 illustrates carrier aggregation (CA) communication system.

Referring to FIG. 9, a plurality of UL/DL component carriers (CCs) can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. Control information may be transmitted/received only through a specific CC. This specific CC may be referred to as a primary CC and other CCs may be referred to as secondary CCs. For example, when cross-carrier scheduling (or cross-CC scheduling) is applied, a PDCCH for downlink allocation can be transmitted on DL CC #0 and a PDSCH corresponding thereto can be transmitted on DL CC #2. The term "component carrier" may be replaced by other equivalent terms (e.g. "carrier", "cell", etc.).

For cross-CC scheduling, a carrier indicator field (CIF) is used. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.

No CIF

CIF enabled: a PDCCH on a DL CC can be used to allocate a PDSCH or PUSCH resource on a specific DL/UL CC from among a plurality of aggregated DL/UL CCs using the CIF.

LTE DCI format extended to have CIF

CIF corresponds to a fixed x-bit field (e.g. x=3) (when CIF is set)

CIF position is fixed irrespective of DIC format size (when CIF is set)

When the CIF is present, the BS may allocate a monitoring DL CC (set) to reduce BD complexity of the UE. For PDSCH/PUSCH scheduling, the UE may detect/decode a PDCCH only on the corresponding DL CCs. The BS may transmit the PDCCH only through the monitoring DL CC (set). The monitoring DL CC set may be set UE-specifically, UE-group-specifically or cell-specifically.

Figure 10:
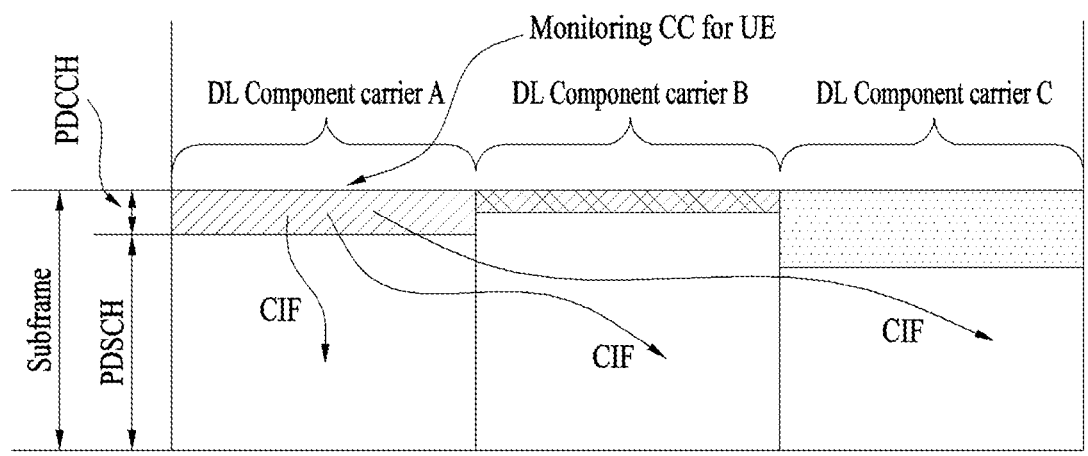
FIG. 10 illustrates cross-carrier scheduling.

FIG. 10 illustrates scheduling when a plurality of carriers is aggregated. It is assumed that 3 DL CCs are aggregated and DL CC A is set to a PDCCH CC. DL CC A~C may be referred to as a serving CC, serving carrier, serving cell, etc. When the CIF is disabled, each DL CC can transmit only a PDCCH that schedules a PDSCH corresponding to the DL CC without a CIF according to LTE PDCCH rule (non-cross-CC scheduling). When the CIF is enabled through UE-specific (or UE-group-specific or cell-specific) higher layer signaling, a specific CC (e.g. DL CC A) can transmit not only the PDCCH that schedules the PDSCH of DL CC A but also PDCCHs that schedule PDSCHs of other DL CCs using the CIF (cross-scheduling). A PDCCH is not transmitted on DL CC B and DL CC C.

As more and more telecommunication devices require greater communication capacity, efficient utilization of limited frequency bands in future wireless communication systems is increasingly important. Basically, the frequency spectrum is divided into a licensed band and an unlicensed band. The licensed band includes frequency bands reserved for specific uses. For example, the licensed band includes government allocated frequency bands for cellular communication (e.g., LTE frequency bands). The unlicensed band is a frequency band reserved for public use and is also referred to as a license-free band. The unlicensed band may be used by anyone without permission or declaration so long as such use meets radio regulations. The unlicensed band is distributed or designated for use by anyone at a close distance, such as within a specific area or building, in an output range that does not interfere with the communication of other wireless stations, and is widely used for wireless remote control, wireless power transmission, Wi-Fi, and the like.

Cellular communication systems such as LTE systems are also exploring ways to utilize unlicensed bands (e.g., the 2.4 GHz band and the 5 GHz band), used in legacy Wi-Fi systems, for traffic off-loading. Basically, since it is assumed that wireless transmission and reception is performed through contention between communication nodes, it is required that each communication node perform channel sensing (CS) before transmitting a signal and confirm that none of the other communication nodes transmit a signal. This operation is referred to as clear channel assessment (CCA), and an eNB or a UE of the LTE system may also need to perform CCA for signal transmission in an unlicensed band. For simplicity, the unlicensed band used in the LTE-A system is referred to as the LTE-U band. In addition, when an eNB or UE of the LTE system transmits a signal, other communication nodes such as Wi-Fi should also perform CCA in order not to cause interference. For example, in the 801.11ac Wi-Fi standard, the CCA threshold is specified to be −62 dBm for non-Wi-Fi signals and −82 dBm for Wi-Fi signals. Accordingly, the station (STA)/access point (AP) does not perform signal transmission so as not to cause interference when a signal other than Wi-Fi signals are received at a power greater than or equal to −62 dBm. In a Wi-Fi system, the STA or AP may perform CCA and signal transmission if a signal above a CCA threshold is not detected for more than 4 µs.

Figure 11:
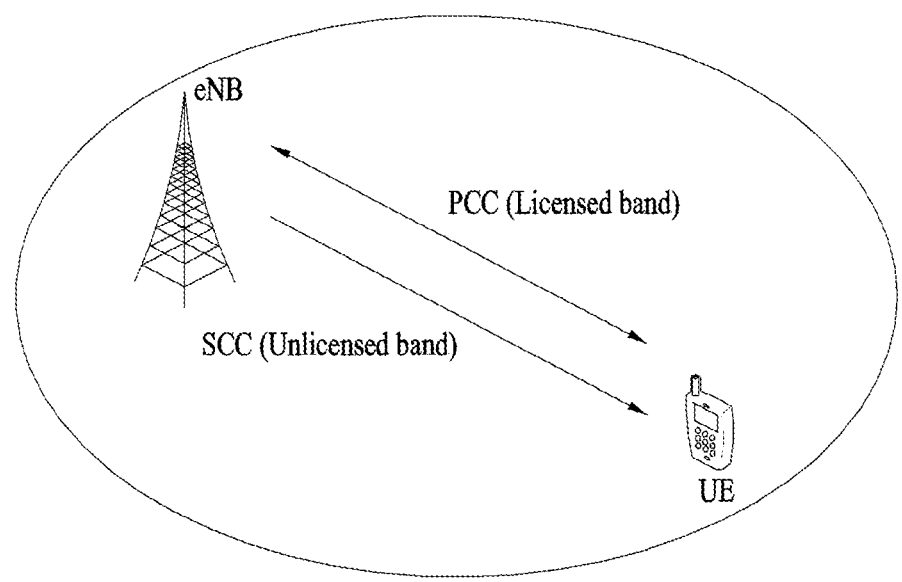
FIG. 11 illustrates carrier aggregation of a licensed band and an unlicensed band.

FIG. 11 illustrates carrier aggregation of a licensed band and an unlicensed band. Referring to FIG. 11, an eNB may transmit a signal to a UE or the UE may transmit a signal to the eNB in a situation of carrier aggregation of the licensed band (hereinafter, LTE-A band, L-band) and the unlicensed band (hereinafter, LTE-U band, U-band). Here, the center carrier or frequency resource of the license band may be interpreted as a PCC or PCell, and the center carrier or frequency resource of the unlicensed band may be interpreted as an SCC or SCell.

Figure 12:
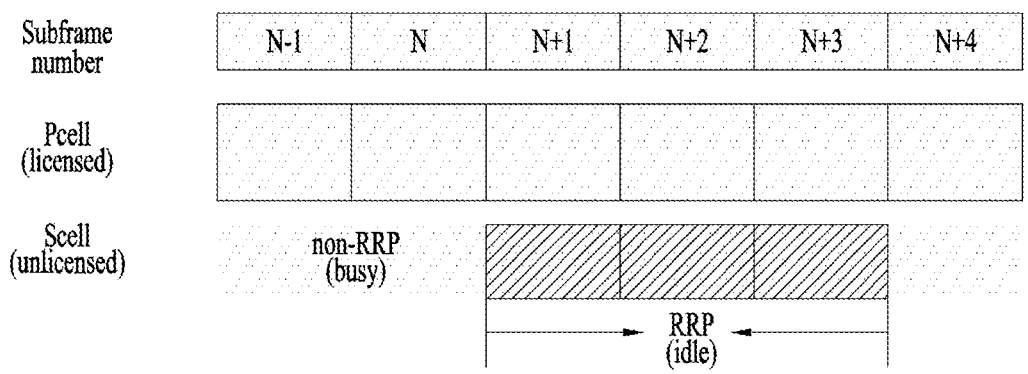
FIGS. 12 and 13 illustrate a method of occupying resources within an unlicensed band.
Figure 13:
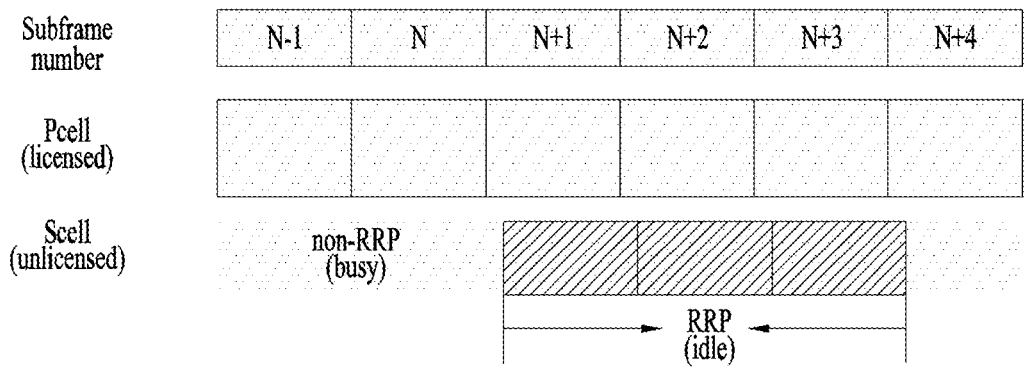

FIGS. 12 and 13 illustrate a method of occupying resources within a licensed band. In order to perform communication between an eNB and a UE in an LTE-U band, the band should be occupied/secured for a specific time period through contention with other communication systems (e.g., Wi-Fi) unrelated to LTE-A. For simplicity, the time period occupied/secured for cellular communication in the LTE-U band is referred to as a reserved resource period (RRP). There are various methods for securing the RRP interval. For example, a specific reservation signal may be transmitted such that other communication system devices such as Wi-Fi can recognize that the corresponding wireless channel is busy. For example, the eNB may continuously transmit an RS and data signal such that a signal having a specific power level or higher is continuously transmitted during the RRP interval. If the eNB has predetermined the RRP interval to occupy in the LTE-U band, the eNB may pre-inform the UE of the RRP interval to allow the UE to maintain the communication transmission/reception link during the indicated RRP interval. The RRP interval information may be transmitted to the UE through another CC (e.g., the LTE-A band) connected through carrier aggregation.

For example, an RRP interval consisting of M consecutive subframes (SF) may be configured. Alternatively, one RRP interval may be configured as a set of non-consecutive SFs (not shown). Here, the eNB may pre-inform the UE through higher layer signaling (e.g., RRC or MAC signaling) or a physical control/data channel of the value of M and the usage of the M SFs (using PCell). The start time of the RRP interval may be set periodically by higher layer signaling (e.g., RRC or MAC signaling). Alternatively, the start time of the RRP interval may be specified through physical layer signaling (e.g., (E)PDCCH) in SF #n or SF # (n-k) when the start time of the RRP interval needs to be set to SF #n. Here, k is a positive integer (e.g., 4).

The RRP may be configured such that the SF boundary and the SF number/index thereof are aligned with the PCell (FIG. 2) (hereinafter, "aligned-RRP"), or configured to support the format in which the SF boundary or the SF number/index is not aligned with the PCell (hereinafter, "floating-RRP") (FIG. 13). In the present invention, the SF boundaries being aligned between cells may mean that the interval between SF boundaries of two different cells is shorter than or equal to a specific time (e.g., CP length or X μs (X>0)). In addition, in the present invention, a PCell may refer to a cell that is referenced in order to determine the SF (and/or symbol) boundary of a UCell in terms of time (and/or frequency) synchronization.

As another example of operation in the unlicensed band performed in a contention-based random access scheme, the eNB may perform carrier sensing before data transmission/reception. If a current channel status of the SCell is determined as being an idle when the channel status is checked for whether it is busy or idle, the eNB may transmit a scheduling grant (e.g., (E)PDCCH) through the PCell (LTE-A band) or the SCell (LTE-U band), and attempt to perform data transmission/reception on the SCell. For convenience, a serving cell (e.g., PCell and SCell) operating in a licensed band is defined as LCell and a center frequency of the LCell is defined as (DL/UL) LCC. A serving cell (e.g., SCell) operating in an unlicensed band is defined as UCell and a center frequency of the UCell is defined as (DL/UL) UCC. In addition, a case in which a UCell is scheduled from the same cell and a case in which a UCell is scheduled from a different cell (e.g., PCell) are respectively referred to as self-CC scheduling and cross-CC scheduling.

Embodiment: Signal Transmission and Reception in LTE LAA (Licensed Assisted Access)

In LTE-A, CA for a plurality of serving cells (i.e., cells) may be set for one UE, and UL control signaling (e.g., a PUCCH) carrying HARQ-ACK feedback for DL data (e.g., a PDSCH) transmission scheduled in the plurality of cells may be performed only through a PCell. In addition, to reduce UL control resource burden due to intensive PUCCH transmission in a PCell (in a manner of offloading to other cells, for example) and to support simultaneous access to cell groups (e.g., CGs) controlled/managed by different base stations, that is, setting of DC (Dual Connectivity) for one UE, systems may be configured such that PUCCH transmission can be performed through a specific SCell instead of a PCell in systems following LTE-A.

Distinguished from cells (i.e., LCells) on conventional licensed bands in which DL/UL resources are always consecutively or periodically configured, DL/UL resources are aperiodically or opportunistically configured depending on a CCA result with respect to a UCell radio channel between a base station and a UE in cells (i.e., UCells) on unlicensed bands. CCA results are divided into CCA success/failure. A CCA result corresponds to CCA success when a channel sensing result indicates that a channel is idle and corresponds to CCA failure when the channel sensing result indicates that the channel is busy. Accordingly, whether DL scheduling with respect to a UCell is possible is determined according to CCA success/failure of the base station for a UCell radio channel, and transmission of UL data (e.g., a PUSCH) scheduled in the UCell is also determined according to CCA success/failure of the UE for the UCell radio channel.

In future systems, PUCCH offloading to a UCell and/or setting of DC with a cell group (CG) composed of only UCells may be considered. To this end, an operation of enabling transmission of a PUCCH carrying UCI such as HARQ-ACK (i.e., A/N) through the UCell may be required. However, whether to perform UL transmission such as PUSCH transmission through the UCell depends on CCA success/failure of the UE for the UCell and this restriction may be also imposed on PUCCH transmission. For example, to transmit an A/N PUCCH for PDSCH reception through the UCell, the UE may perform CCA for the UCell. The UE may transmit the PUCCH to the UCell when the CCA result is CCA success and drop PUCCH transmission when the CCA result is CCA failure.

In a situation of A/N PUCCH transmission on the UCell, the base station performs DTX detection for PUCCH transmission of the UE to predict CCA failure in the UE and may perform an appropriate operation (e.g., retransmission PDSCH scheduling) according thereto. However, 1) a DTX-to-ACK error may cause RLC (Radio Link Control) level retransmission to considerably increase latency when PUCCH DTX detection performance in the base station is not secured, 2) ACK-to-DTX error may cause unnecessary PDSCH retransmission (and DL grant PDCCH transmission for scheduling thereof) even if PUCCH DTX detection performance is secured, or 3) NACK-to-DTX error may cause unnecessary DCI overhead increase (because the base station erroneously predicts the cause of PUCCH DTX as DL grant PDCCH detection failure instead of CCA failure of the UE).

To solve this, a method of providing multiple PUCCH transmission opportunities for the same A/N information in the case of the UCell (distinguished from the conventional LCell) may be considered. That is, the UE may be configured to perform multiple CCA procedures for A/N PUCCH transmission. However, A/N transmission timings for PDSCH receptions in different DL SFs may overlap in the same UL SF (according to a CCA result of the UE for each UL SF) and thus inconsistency in A/N payload configuration may occur between the UE and the base station (i.e., which A/N information corresponds to which DL SF is ambiguous). For example, when the UE is configured to respectively perform A/N transmissions for PDSCH receptions in DL SF #n and DL SF #(n+1) through UL SF #(n+K) and UL SF #(n+K+1), if the UE fails in CCA with respect to UL SF #(n+K) and succeeds in CCA with respect to UL SF #(n+K+1), which one of A/N signals for DL SF #n and DL SF #(n+1) will be transmitted through UL SF #(n+K+1) may be ambiguous.

The present invention proposes effective methods of transmitting a UCI PUCCH on a UCell which are able to prevent inconsistency in A/N payload configuration while providing multiple PUCCH transmission (multiple CCA procedures therefor) opportunities. Prior to description, it is assumed that an A/N PUCCH corresponding to PDSCH reception in DL SF #n is transmitted through UL SF #(n+K) in an ideal situation having no CCA failure (e.g., K=4) and DL SF #n corresponds to UL SF #(n+K). In the present invention, DL grant DCI for scheduling PUCCH transmission in SF #(n+K) and PDSCH transmission in SF #n corresponding thereto may be replaced by UL grant DCI for scheduling PUSCH transmission in SF #(n+K) and the corresponding PUSCH.

In the present invention, a PUCCH payload transmitted through one UL SF may be composed of multiple A/Ns for an SF group (composed of multiple SFs) including a DL SF corresponding to the UL SF and previous SFs. The following A/N transmission methods may be considered according to methods of configuring an SF group (and configuring an A/N payload according thereto).

(1) Method 1: SF Number Based A/N Payload Configuration (SF Group Based A/N)

In this method, a plurality of A/Ns for an SF group composed of a plurality of SFs having consecutive SF numbers may be configured as an A/N payload on one PUCCH. Accordingly, an SF group corresponding to A/N PUCCH transmission in a UL SF may be composed of a DL SF corresponding to the UL SF and previous consecutive SFs. Specifically, (when PDSCH transmission in SF #n is scheduled) an A/N payload transmitted through UL SF #(n+K) may be composed of A/N for an SF group composed of L SFs of SF #(n−L+1) to SF #n. The value L (and/or K, which are SF group start time related information) corresponding to the SF group size may be preset through higher layer signaling such as RRC signaling or directly indicated through DL grant DCI (which schedules PDSCH transmission in SF #n, for example).

For example, if the UE fails in CCA for UL SF #(n+K) on the UCell in a state in which PDSCH transmission in SF #n is scheduled, the UE may be given multiple opportunities to perform CCA for M UL SFs including UL SF #(n+K) and permitted to perform A/N PUCCH transmission according to the CCA result. The value M corresponds to the (maximum) number of CCA or PUCCH transmission opportunities and may be preset through higher layer signaling such as RRC signaling or directly indicated through DL grant DCI (which schedules PDSCH transmission in SF #n, for example). Based on this, the UE may 1) perform A/N PUCCH transmission only through a UL SF in which CCA has been initially successfully performed among the M UL SFs or 2) perform A/N PUCCH transmission through all UL SFs in which CCA has been successfully performed among the M UL SFs. When CCA for UL SF #(n+K) has failed and then CCA for UL SF #(n+K+m) has been successfully performed, A/N for L SFs shifted by m SFs in the SF group corresponding to UL SF #(n+K), that is, SF #((n+m)−(L+1)) to SF #(n+m) may be transmitted through the PUCCH in UL SF #(n+K+m).

Alternatively, the UE may operate to transmit A/N for an SF group corresponding to a UL SF through a PUCCH/PUSCH in all UL SFs all the time irrespective of PDSCH reception/scheduling in an SF (e.g., SF #n corresponding to UL SF #(n+K)) corresponding to the UL SF in which PUCCH/PUSCH transmission is performed. Alternatively, only when PDSCH reception/scheduling is present in an SF (e.g., SF #n corresponding to UL SF #(n+K)) corresponding to a UL SF in which PUCCH/PUSCH transmission is performed, the UE may transmit A/N for an SF group corresponding to the UL SF through the PUCCH/PUSCH. Alternatively, only when PDSCH reception/scheduling is present in an SF group (e.g., L SFs of SF #(n−L+1) to SF #n corresponding to UL SF #(n+K)) corresponding to a UL SF in which PUCCH/PUSCH transmission is performed, the UE may transmit A/N for the SF group through the PUCCH/PUSCH. Here, "when PDSCH reception/scheduling is present" may be limited to cases in which there is to-be-newly-transmitted A/N of a specific number of bits (e.g., X) or more or a specific % (e.g., Y %) or more in a maximum A/N payload (e.g., a total number of A/N bits when SF group based A/N is configured for all cells). X and Y are positive numbers (e.g., integers).

Alternatively, whether to transmit A/N for an SF group corresponding to a UL SF in which PUSCH transmission is performed through the corresponding PUSCH may be directly indicated through a UL grant which schedules PUSCH transmission. For example, in a state in which a plurality of cell groups has been configured through higher layer signaling (e.g., RRC signaling), a cell group (PDSCH scheduling therein) for which SF group based A/N will be transmitted through a PUSCH among the plurality of cell groups may be indicated through a UL grant. In the case of a multi-SF scheduling method for simultaneously scheduling multiple PUSCH transmissions in multiple SFs through single UL grant DCI transmission, indication of whether to transmit A/N may be provided per PUSCH transmission in each SF or only one indication with respect to whether to transmit A/N may be provided for PUSCH transmission in all SFs. In the latter case, one A/N transmission indication may be 1) applied to all scheduled PUSCH transmissions, 2) applied only to the initially scheduled/transmitted PUSCH or 3) applied only to the initially scheduled/transmitted PUSCH in an SF groups having consecutive SFs when scheduled SFs are not consecutive.

For example, if the UE fails in CCA for UL SF #(n+K) on the UCell in a state in which transmission of a PUSCH including A/N has been scheduled in UL SF #(n+K), the UE may be given multiple opportunities to perform CCA for UL SF #(n+K) and following M UL SF and permitted to perform PUSCH transmission according to the CCA result. Here, the value M corresponds to the (maximum) number of CCA or PUSCH transmission opportunities and may be preset through higher layer signaling such as RRC signaling or directly indicated through UL grant DCI (which schedules PUSCH transmission in SF #(n+K), for example). Based on this, the UE may 1) perform PUSCH transmission only through a UL SF in which CCA has been initially successfully performed among the M UL SFs or 2) perform PUSCH transmission through all UL SFs in which CCA has been successfully performed among the M UL SFs. When CCA for UL SF #(n+K) has failed and then CCA for UL SF #(n+K+m) has been successfully performed, A/N for L SFs shifted by m SFs in the SF group corresponding to UL SF #(n+K), that is, SF #((n+m)−(L+1)) to SF #(n+m) may be transmitted through the PUSCH in UL SF #(n+K+m).

FIG. 14 illustrates an A/N transmission method when L=4 and K=4. Referring to FIG. 14, when CCA for UL SF #(n+K) has been successfully performed, a UE may transmit A/N for SF #(n−4+1) to SF #n in SF #(n+K). If CCA for UL SF #(n+K) has failed and then CCA for UL SF #(n+K+1) has been successfully performed, the UE may transmit A/N for SF #((n+1)−(4+1) to SF #(n+1) in SF #(n+K+1). A/N may be transmitted through a PUCCH or a PUSCH.

For more flexible DL/UL resource configuration and operation/management on UCells, a method of directly indicating an A/N transmission timing corresponding to PDSCH reception through DL grant DCI may be considered. Specifically, when a minimum delay between a PDSCH and A/N is assumed to be Dm SFs (e.g., Dm=4) and an A/N delay value indicated through DL grant DCI is assumed to be Dg (e.g., Dg=0, 1, . . . ), a time corresponding to (Dm+Dg) SFs may be determined as an actual delay between the PDSCH and the A/N. When the number of A/N delay values of Dg is assumed to be Nd (e.g., Dg=0, 1, . . . , Nd−1), an A/N payload (codebook) transmitted through a PUCCH/PUSCH in SF #N may be composed of A/N responses to PDSCH receptions in Nd SFs corresponding to SF #(N−Dm−Dg). In this case, Method 1 may be applied with Nd and Dm replaced by L and M respectively (here, M=1 or M>1), and the SF group size L may be set to a value greater than the number of A/N delay values, Nd, in order to provide multiple PUCCH transmission (multiple CCA procedures therefor) opportunities for A/N corresponding to one PDSCH.

If the UE is aware of actual DL/UL SF configuration information on a UCell through specific signaling, the number of DL SFs (i.e., A/N payload size) corresponding to an actual A/N feedback target (except UL SFs or a period having no SF configuration) may be set differently per UL SF in which A/N transmission is performed within a corresponding SF group. Here, specific signaling may be UE-common signaling (SF-config DCI) (e.g., PDCCH) transmitted through a DL SF (e.g., a PDCCH common search space on the DL SF) on the UCell. For example, in a state in which the SF group size L is given, 1) an A/N payload may be configured only for SFs corresponding to DL among L consecutive SFs (before a specific time) on the basis of the specific time (prior to an A/N transmission SF) without discriminating DL SF from UL SF or 2) an A/N payload may be configured for L sequential DL SFs (before a specific time) on the basis of the specific time (prior to an A/N transmission SF) irrespective of whether the DL SFs are consecutive.

In addition, the number of A/N PUCCH transmission opportunities may be set per DL SF scheduled for the UE according to DL/UL SF configuration on the UCell. For example, in a state in which the number of PUCCH transmission opportunities, M, is given, 1) A/N PUCCH transmission may be performed only through SFs corresponding to UL among M consecutive SFs (after a specific time) on the basis of the specific time (after an A/N transmission SF) without discriminating DL SF from UL SF or 2) A/N transmission (corresponding to a relevant DL SF) may be performed through M sequential UL SFs (after a specific time) on the basis of the specific time (after a scheduled DL SF) irrespective of whether the UL SFs are consecutive.

In the present method, multiple A/Ns for multiple SFs are transmitted through a single PUCCH, and thus a larger UCI payload size and a larger amount of UL control resources may be required compared to a PUCCH carrying a single A/N. To reduce such overhead, an A/N payload in UL SF #(n+K) may be configured using only a single A/N for SF #n (instead of multiple A/Ns for an entire SF group) when an SF group corresponding to UL SF #(n+K) includes only one SF in which a PDSCH scheduled, SF #n (which is referred to as single SF A/N). Accordingly, when a PDSCH is scheduled in SFs other than SF #n, an A/N payload may be composed of multiple A/Ns for an SF group of SF #(n−L+1) to SF #n (which is referred to as SF group A/N). PUCCH formats (and/or the numbers of resources) used for single SF A/N and SF group A/N may be set/allocated differently.

In the case of Method 1, A/N transmission opportunity for a DL SF which is not included in an SF group may be lost when the SF group size decreases and the UE frequently fails in CCA (continuously) due to characteristics of an operation of transmitting A/N for an SF group shifted in time. To alleviate this phenomenon, an A/N payload may be configured on the basis of a HARQ process ID (Method 2) or an A/N payload may be configured on the basis of a DAI in DL grant DCI (Method 3).

(2) Method 2: HARQ Process ID Based A/N Payload Configuration (HARQ Process ID Based A/N)

In this method, a plurality of A/Ns corresponding to all HARQ process IDs may be configured as an A/N payload on one PUCCH. Specifically, if there are N HARQ process IDs of 0 to (N−1), a plurality of A/Ns corresponding to the N HARQ process IDs may be transmitted through one PUCCH. Alternatively, all HARQ process IDs may be divided into a plurality of ID groups (through higher layer signaling such as RRC signaling) in advance and then A/N to be transmitted which corresponds to one of the plurality of ID groups may be indicated through DL grant DCI. In this case, HARQ process IDs may be configured such that one HARQ process ID (commonly) belongs to one or more ID groups. Further, one of the plurality of ID groups may include all HARQ process IDs. When a plurality of A/Ns for PDSCHs having different reception timings is present for the same HARQ process ID, A/N for the most recently received PDSCH may be determined as A/N corresponding to the HARQ process ID.

When PDSCH transmission is scheduled in SF #n, for example, as in Method 1, in this method, multiple CCA execution opportunities may be given for UL SF #(n+K) corresponding to SF #n and following M UL SF and an operation of performing A/N PUCCH transmission may be allowed according to the CCA result. Here, the value M corresponds to the (maximum) number of CCA execution or PUCCH transmission opportunities and may be set/indicated through higher layer signaling such as RRC signaling or DL grant DCI. A UE 1) may perform A/N PUCCH transmission only through a UL SF in which CCA has been initially successfully performed among the M UL SFs or 2) may perform A/N PUCCH transmission through all UL SFs in which CCA has been successfully performed among the M UL SFs. Accordingly, A/N information corresponding to the same HARQ process ID may be transmitted through a plurality of PUCCHs multiple times. Here, A/N information corresponding to each HARQ process ID may be reset/repeated per PUCCH transmission. Whether resetting/repetition is performed may be set by a BS or determined according to intervals of UL SFs in which A/N PUCCH transmission is performed. For example, when the intervals of the UL SFs are less than a reference value (e.g., P SFs), A/N information corresponding to each HARQ process ID may be repeated per PUCCH transmission. When the intervals of the UL SFs are greater than the reference value (e.g., P SFs), A/N information corresponding to each HARQ process ID may be reset per PUCCH transmission. P corresponds to the number of HARQ process IDs or a multiple thereof.

A case in which A/N information corresponding to each HARQ process ID is reset per PUCCH transmission is described. For example, when a decoding result with respect to PDSCH reception (HARQ process ID=0) in SF #n is ACK, A/N information corresponding to HARQ process ID=0 may be mapped as ACK only to a payload of a PUCCH initially transmitted after UL SF #(n+K) including UL SF #(n+K) and A/N information corresponding to HARQ process ID=0 may be reset in a payload of a PUCCH transmitted following the initially transmitted PUCCH. When a decoding result with respect to PDSCH reception (HARQ process ID=0) in SF #n is NACK (or DTX), A/N information corresponding to HARQ process ID=0 may be mapped as NACK (or DTX) to a payload of a PUCCH initially transmitted after UL SF #(n+K) including UL SF #(n+K) and A/N information corresponding to HARQ process ID=0 may be updated according to a retransmission data decoding result in a payload of the PUCCH transmitted following the initially transmitted PUCCH. When there is no new transmission (e.g., PDSCH transmission) corresponding to HARQ process ID=0 after A/N information corresponding to HARQ process ID=0 is reset, the A/N information corresponding to HARQ process ID=0 may be mapped as DTX (or NACK). On the contrary, when there is a new transmission (e.g., PDSCH transmission) corresponding to HARQ process ID=0 after the A/N information corresponding to HARQ process ID=0 is reset, the A/N information corresponding to HARQ process ID=0 may be mapped to a decoding result with respect to the new transmission (e.g., PDSCH transmission).

Alternatively, the UE may operate to always transmit A/N for (all) HARQ process IDs (groups) through a PUCCH/PUSCH in all UL SFs irrespective of PDSCH reception/scheduling in an SF corresponding to a UL SF in which PUCCH/PUSCH transmission is performed (e.g., SF #n corresponding to UL SF #(n+K)). Alternatively, the UE may transmit A/N for (all) HARQ process IDs (groups) through a PUCCH/PUSCH only when PDSCH reception/scheduling exists in an SF corresponding to a UL SF in which PUCCH/PUSCH transmission is performed (e.g., SF #n corresponding to UL SF #(n+K)). Alternatively, the UE may transmit A/N for (all) HARQ process IDs (groups) through a PUCCH/PUSCH only when PDSCH reception/scheduling exists in an SF group corresponding to a UL SF in which PUCCH/PUSCH transmission is performed (e.g., L SFs of SF #(n−L+1) to SF #n corresponding to UL SF #(n+K)). Here, "when PDSCH reception/scheduling exists" may be limited to cases in which there is A/N corresponding to a specific number of bits (e.g., X) or more or specific % (e.g., Y %) or more which will be newly transmitted in a maximum A/N payload (e.g., a total number of A/N bits when HARQ process ID based A/N is configured for all cells). X and Y are positive numbers (e.g., integers).

Alternatively, it is possible to indicate whether A/N for (all) HARQ process IDs (groups) is transmitted through a PUSCH through a UL grant which schedules PUSCH transmission or a DL grant which schedules PDSCH transmission. For example, in a state in which a plurality of cell groups has been set through higher layer signaling (e.g., RRC signaling) in advance, a cell group (PDSCH scheduling therein) for which HARQ process ID based A/N will be transmitted through a PUSCH may be indicated through a UL grant/DL grant. In the case of multi-SF scheduling method in which multiple PUSCH transmissions in multiple SFs are simultaneously scheduled through single UL grant DCI transmission, whether A/N is transmitted may be individually indicated per PUSCH transmission in each SF or whether A/N is transmitted may be indicated once for PUSCH transmission in all SFs. In the latter case, one indication of whether A/N is transmitted 1) may be applied to all scheduled PUSCH transmissions, 2) may be applied to only an initially scheduled/transmitted PUSCH or 3) may be applied to an initially scheduled/transmitted PUSCH in a group of consecutive SFs when scheduled SFs are not consecutive.

When transmission of a PUSCH including A/N is scheduled in UL SF #(n+K) as in Method 1, in this method, the UE is given multiple CCA execution opportunities for UL SF #(n+K) and following M UL SF and may be allowed to perform an operation of performing PUSCH transmission according to the CCA result. Here, the value M corresponds to the (maximum) number of CCA execution or PUSCH transmission opportunities and may be previously set through higher layer signaling such as RRC signaling or indicated through UL grant DCI (which schedules PUSCH transmission in UL SF #(n+K), for example). The UE 1) may perform transmission of the PUSCH (including A/N) only through a UL SF in which CCA has been initially successfully performed among the M UL SFs or 2) may perform transmission of the PUSCH (including A/N) through all UL SFs in which CCA has been successfully performed among the M UL SFs. Accordingly, A/N information corresponding to the same HARQ process ID may be transmitted through a plurality of PUSCHs multiple times. Here, A/N information corresponding to each HARQ process ID may be reset/repeated per PUSCH transmission. Whether resetting/repetition is performed may be set by a BS or determined according to intervals of UL SFs in which A/N PUSCH transmission is performed. For example, when the intervals of the UL SFs are less than a reference value (e.g., P SFs), A/N information corresponding to each HARQ process ID may be repeated per PUSCH transmission. When the intervals of the UL SFs are greater than the reference value (e.g., P SFs), A/N information corresponding to each HARQ process ID may be reset per PUSCH transmission. P corresponds to the number of HARQ process IDs or a multiple thereof.

A case in which A/N information corresponding to each HARQ process ID is reset per PUSCH transmission is described. For example, when a decoding result with respect to PDSCH reception (HARQ process ID=0) in SF #n is ACK, A/N information corresponding to HARQ process ID=0 may be mapped as ACK only to a payload of a PUSCH initially transmitted after UL SF #(n+K) including UL SF #(n+K) and A/N information corresponding to HARQ process ID=0 may be reset in a payload of a PUSCH transmitted following the initially transmitted PUCCH. When a decoding result with respect to PDSCH reception (HARQ process ID=0) in SF #n is NACK (or DTX), A/N information corresponding to HARQ process ID=0 may be mapped as NACK (or DTX) to a payload of a PUSCH initially transmitted after UL SF #(n+K) including UL SF #(n+K) and A/N information corresponding to HARQ process ID=0 may be updated according to a retransmission data decoding result in a payload of the PUSCH transmitted following the initially transmitted PUSCH. When there is no new transmission (e.g., PDSCH transmission) corresponding to HARQ process ID=0 after A/N information corresponding to HARQ process ID=0 is reset, the A/N information corresponding to HARQ process ID=0 may be mapped as DTX (or NACK). On the contrary, when there is a new transmission (e.g., PDSCH transmission) corresponding to HARQ process ID=0 after the A/N information corresponding to HARQ process ID=0 is reset, the A/N information corresponding to HARQ process ID=0 may be mapped to a decoding result with respect to the new transmission (e.g., PDSCH transmission).

In this method, a plurality of A/Ns corresponding to a plurality of HARQ process IDs is transmitted through one PUCCH and thus a relatively large UCI payload size and a large amount of UL control resources may be needed. In consideration of this, when there is only one HARQ process ID scheduled through SF #n as an actually scheduled HARQ process ID (corresponding to a case in which a PDSCH signal exists in a reception buffer) among all HARQ process IDs, an A/N payload in UL SF #(n+K) may be composed of only a single A/N for SF #n (instead of a plurality of A/Ns for all HARQ process IDs) (referred to as "single ID A/N" hereinafter). Accordingly, when a PDSCH is scheduled for SFs other than SF #n (or HARQ process IDs other than the HARQ process ID scheduled in SF #n), an A/N payload may be composed of a plurality of A/Ns for all HARQ process IDs (referred to as "all ID A/N" hereinafter). PUCCH formats (and/or the number of resources) used in single ID A/N and all ID A/N may be differently set/allocated.

Furthermore, an A/N payload configuration method combined with the SF group concept of Method 1 is possible. Accordingly, A/N corresponding to a HARQ process ID may be configured only for PDSCH scheduling in a specific SF group. For example, an A/N payload in UL SF #(n+K) may be composed of A/N corresponding to a HARQ process ID only on the basis of PDSCH scheduling in a group of SFs of SF #(n+m-L+1) to SF #(n+m).

(3) Method 3: DAI Based A/N Payload Configuration (DAI Based A/N)

In this method, a DAI indicating a scheduling order value of a PDSCH (e.g., the order of scheduling of the PDSCH in a given SF period) corresponding to DL grant DCI is basically signaled through the DL grant DCI, and a plurality of A/Ns corresponding to N DAI values may be transmitted through one PUCCH (if the DAI has values of 0 to N). Alternatively, in a state in which all DAI values have been divided into a plurality of DAI groups, a DAI group for which A/N will be transmitted may be indicated through DL grant DCI. In this case, one DAI value may (commonly) belong to one or more DAI groups. Further, one of the plurality of DAI groups may include all DAI values.

When PDSCH transmission is scheduled in SF #n, for example, as in Method 1, in this method, multiple CCA execution opportunities may be given for UL SF #(n+K) corresponding to SF #n and following M UL SF and an operation of performing A/N PUCCH transmission may be allowed according to the CCA result. Here, the value M corresponds to the (maximum) number of CCA execution or PUCCH transmission opportunities and may be set/indicated through higher layer signaling such as RRC signaling or DL grant DCI. A UE 1) may perform A/N PUCCH transmission only through a UL SF in which CCA has been initially successfully performed among the M UL SFs or 2) may perform A/N PUCCH transmission through all UL SFs in which CCA has been successfully performed among the M UL SFs. Accordingly, A/N information corresponding to the same DAI value may be transmitted through a plurality of PUCCHs multiple times. Here, A/N information corresponding to each DAI value may be reset/repeated per PUCCH transmission. Whether resetting/repetition is performed may be set by a BS or determined according to intervals of UL SFs in which A/N PUCCH transmission is performed. For example, when the intervals of the UL SFs are less than a reference value (e.g., Q SFs), A/N information corresponding to each DAI may be repeated per PUCCH transmission. When the intervals of the UL SFs are greater than the reference value (e.g., P SFs), A/N information corresponding to each DAI may be reset per PUCCH transmission. Q corresponds to the number of DAIs or a multiple thereof.

A case in which A/N information corresponding to a DAI is reset per PUCCH transmission is described. For example, when a decoding result with respect to PDSCH reception (DAI=1) in SF #n is ACK, A/N information corresponding to DAI=1 may be mapped as ACK only to a payload of a PUCCH initially transmitted after UL SF #(n+K) including UL SF #(n+K) and A/N information corresponding to DAI=1 may be reset in a payload of a PUCCH transmitted following the initially transmitted PUCCH. When a decoding result with respect to PDSCH reception (DAI=1) in SF #n is NACK (or DTX), A/N information corresponding to DAI=1 may be mapped as NACK (or DTX) to a payload of a PUCCH initially transmitted after UL SF #(n+K) including UL SF #(n+K) and A/N information corresponding to DAI=1 may be updated according to a retransmission data decoding result in a payload of the PUCCH transmitted following the initially transmitted PUCCH. When there is no new transmission (e.g., PDSCH transmission) corresponding to DAI=1 after A/N information corresponding to DAI=1 is reset, the A/N information corresponding to DAI=1 may be mapped as DTX (or NACK). On the contrary, when there is a new transmission (e.g., PDSCH transmission) corresponding to DAI=1 after the A/N information corresponding to DAI=1 is reset, the A/N information corresponding to DAI=1 may be mapped to a decoding result with respect to the new transmission (e.g., PDSCH transmission).

Alternatively, the UE may operate to always transmit A/N for (all) DAIs (groups) through a PUCCH/PUSCH in all UL SFs irrespective of PDSCH reception/scheduling in an SF corresponding to a UL SF in which PUCCH/PUSCH transmission is performed (e.g., SF #n corresponding to UL SF #(n+K)). Alternatively, the UE may transmit A/N for (all) DAIs (groups) through a PUCCH/PUSCH only when PDSCH reception/scheduling exists in an SF corresponding to a UL SF in which PUCCH/PUSCH transmission is performed (e.g., SF #n corresponding to UL SF #(n+K)). Alternatively, the UE may transmit A/N for (all) DAIs (groups) through a PUCCH/PUSCH only when PDSCH reception/scheduling exists in an SF group corresponding to a UL SF in which PUCCH/PUSCH transmission is performed (e.g., L SFs of SF #(n-L+1) to SF #n corresponding to UL SF #(n+K)). Here, "when PDSCH reception/scheduling exists" may be limited to cases in which there is A/N corresponding to a specific number of bits (e.g., X) or more or specific % (e.g., Y %) or more which will be newly transmitted in a maximum A/N payload (e.g., a total number of A/N bits when DAI (group) based A/N is configured for all cells). X and Y are positive numbers (e.g., integers).

Alternatively, it is possible to indicate whether A/N for (all) DAIs (groups) is transmitted through a PUSCH through a UL grant which schedules PUSCH transmission or a DL grant which schedules PDSCH transmission. For example, in a state in which a plurality of cell groups which are targets of DAI group based A/N feedback has been set through higher layer signaling (e.g., RRC signaling) in advance, a cell group (PDSCH scheduling therein) for which DAI group based A/N will be transmitted through a PUSCH may be indicated through a UL grant/DL grant. In the case of multi-SF scheduling method in which multiple PUSCH transmissions in multiple SFs are simultaneously scheduled through single UL grant DCI transmission, whether A/N is transmitted may be individually indicated per PUSCH transmission in each SF or whether A/N is transmitted may be indicated once for PUSCH transmission in all SFs. In the latter case, one indication of whether A/N is transmitted 1) may be applied to all scheduled PUSCH transmissions, 2) may be applied to only an initially scheduled/transmitted PUSCH or 3) may be applied to an initially scheduled/transmitted PUSCH in a group of consecutive SFs when scheduled SFs are not consecutive.

When transmission of a PUSCH including A/N is scheduled in UL SF #(n+K) as in Method 1, in this method, the UE is given multiple CCA execution opportunities for UL SF #(n+K) and following M UL SF and may be allowed to perform an operation of performing PUSCH transmission according to the CCA result. Here, the value M corresponds to the (maximum) number of CCA execution or PUSCH transmission opportunities and may be previously set through higher layer signaling such as RRC signaling or indicated through UL grant DCI (which schedules PUSCH transmission in UL SF #(n+K), for example). The UE 1) may perform transmission of the PUSCH (including A/N) only through a UL SF in which CCA has been initially successfully performed among the M UL SFs or 2) may perform transmission of the PUSCH (including A/N) through all UL SFs in which CCA has been successfully performed among the M UL SFs. Accordingly, A/N information corresponding to the same DAI value may be transmitted through a plurality of PUSCHs multiple times. Here, A/N information corresponding to each DAI value may be reset/repeated per PUSCH transmission. Whether resetting/repetition is performed may be set by a BS or determined according to intervals of UL SFs in which A/N PUSCH transmission is performed. For example, when the intervals of the UL SFs are less than a reference value (e.g., Q SFs), A/N information corresponding to each DAI may be repeated per PUSCH transmission. When the intervals of the UL SFs are greater than the reference value (e.g., Q SFs), A/N information corresponding to each DAI may be reset per PUSCH transmission. Q corresponds to the number of DAIs or a multiple thereof.

A case in which A/N information corresponding to each DAI is reset per PUSCH transmission is described. For example, when a decoding result with respect to PDSCH reception (DAI=1) in SF #n is ACK, A/N information corresponding to DAI=1 may be mapped as ACK only to a payload of a PUSCH initially transmitted after UL SF #(n+K) including UL SF #(n+K) and A/N information corresponding to DAI=1 may be reset in a payload of a PUSCH transmitted following the initially transmitted PUCCH. When a decoding result with respect to PDSCH reception (DAI=1) in SF #n is NACK (or DTX), A/N information corresponding to DAI=1 may be mapped as NACK (or DTX) to a payload of a PUSCH initially transmitted after UL SF #(n+K) including UL SF #(n+K) and A/N information corresponding to DAI=1 may be updated according to a retransmission data decoding result in a payload of the PUSCH transmitted following the initially transmitted PUSCH. When there is no new transmission (e.g., PDSCH transmission) corresponding to DAI=1 after A/N information corresponding to DAI=1 is reset, the A/N information corresponding to DAI=1 may be mapped as DTX (or NACK). On the contrary, when there is a new transmission (e.g., PDSCH transmission) corresponding to DAI=1 after the A/N information corresponding to DAI=1 is reset, the A/N information corresponding to DAI=1 may be mapped to a decoding result with respect to the new transmission (e.g., PDSCH transmission).

In this method, a plurality of A/Ns corresponding to a plurality of DAI values is transmitted through one PUCCH and thus a relatively large UCI payload size and a large amount of UL control resources may be needed. In consideration of this, when there is only one DAI value scheduled through SF #n as an actually scheduled DAI value (corresponding to a case in which a PDSCH signal exists in a reception buffer) among all DAI values, an A/N payload in UL SF #(n+K) may be composed of only a single A/N for SF #n (instead of a plurality of A/Ns for all DAI values) (referred to as "single DAI A/N" hereinafter). Accordingly, when a PDSCH is scheduled for SFs other than SF #n (or DAI values other than the DAI value scheduled in SF #n), an A/N payload may be composed of a plurality of A/Ns for all DAI values (referred to as "all DAI A/N" hereinafter). PUCCH formats (and/or the number of resources) used in single DAI A/N and all DAI A/N may be differently set/allocated.

Furthermore, an A/N payload configuration method combined with the SF group concept of Method 1 is possible. Accordingly, A/N corresponding to a DAI may be configured only for PDSCH scheduling in a specific SF group. For example, an A/N payload in UL SF #(n+K) may be composed of A/N corresponding to a DAI only on the basis of PDSCH scheduling in a group of SFs of SF #(n+m-L+1) to SF #(n+m).

As another DAI based method, bundled A/N obtained by executing a logical AND operation on A/Ns corresponding to DAI=1 to a DAI value scheduled in SF #n may be transmitted through a PUCCH in UL SF #(n+K). For PDSCHs having different reception timings for the same DAI value, A/N for the most recently received PDSCH may be determined as A/N corresponding to the DAI value. Further, a bundled A/N configuration method realized by combining the present method and the SF group concept of Method 1 is possible. For example, A/N corresponding to each DAI value may be calculated for only PDSCH scheduling in an SF group and bundled.

With respect to periodic UCI (e.g., a positive SR or periodic CSI) transmission, multiple CCA execution opportunities through a plurality of UL SFs may be given in a set UCI transmission period and an operation of performing UCI PUCCH transmission may be permitted according to the CCA result. In addition, the (maximum) number of CCA execution opportunities (the number of PUCCH transmission opportunities according thereto) may be set differently at a UCI transmission time according to UCI types (e.g., A/N, positive SR and periodic CSI). For example, a maximum of Na CCA execution (PUCCH transmission) opportunities may be given for A/N, a maximum of Ns CCA execution (PUCCH transmission) opportunities may be given for SR and a maximum of Nc CCA execution (PUCCH transmission) opportunities may be given for CSI. Here, Na=Ns>Nc, Na>Ns>Nc or Ns>Na>Nc. Here, Nc may be set as Nc=1 (i.e., only one CCA execution opportunity and PUCCH transmission according thereto are permitted). When all CCAs for the maximum number of CCA execution (PUCCH transmission according thereto) opportunities fail, the UE may operate to drop UCI PUCCH transmission.

Figure 15:
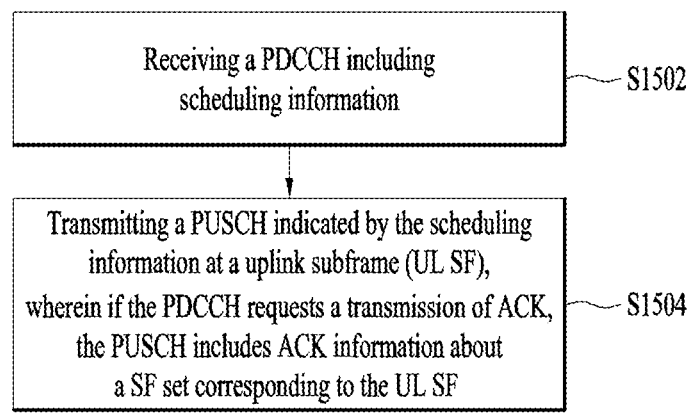

FIG. 15 illustrates an A/N transmission procedure according to the present invention.

Referring to FIG. 15, a UE may receive a PDCCH having uplink scheduling information (S1502). Then, the UE may transmit a PUSCH indicated by the uplink scheduling information in a UL SF (S1504). Here, when the PDCCH requests ACK transmission, the PUSCH may include ACK information about an SF set corresponding to the UL SF. The SF set may include a plurality of SFs. When the PDCCH does not request ACK transmission, the PUSCH does not include ACK information about the SF set corresponding to the UL SF. Here, the SF set may include a plurality of consecutive SFs (Method 1). Further, the SF set may include a plurality of SFs corresponding to a plurality of HARQ process IDs (Method 2). Further, the SF set may include a plurality of SFs corresponding to a plurality of DAIs (Method 3). Here, the scheduling information includes scheduling information about a plurality of PUSCHs, the PDCCH may further include ACK request information, and the ACK request information may be applied only to the initially scheduled PUSCH among the plurality of PUSCHs. Further, UL and DL transmission resources may be aperiodically configured in wireless communication systems to which the present invention is applied. In addition, the present invention may be applied to UCells.

(4) UE-Common Signaling Based Aperiodic SRS Transmission Method

As a method of indicating/performing aperiodic SRS transmission on any cell including a UCell, a method of simultaneously triggering aperiodic SRS transmissions of a plurality of UEs through specific UE-common signaling may be considered. For example, in a state in which each bit in a specific DCI format (e.g., DCI format 3/3A) is set to be used to indicate whether aperiodic SRS transmission of an individual UE is performed (and SRS transmission resources (e.g., an RPB index, a transmission comb and a cyclic shift) and a timing delay between a triggering time and an SRS transmission time), whether aperiodic SRS transmission of a UE is performed, which is set to the corresponding bit, may be indicated according to the value of each bit (e.g., 0 or 1). For example, SRS transmission may be dropped when bit=0 and SRS transmission may be preformed when bit=1. Alternatively, in a state in which N different bits (N>1) in DCI are set to be used to indicate whether aperiodic SRS transmission of an individual UE is performed/aperiodic SRS transmission timing, whether aperiodic SRS transmission of a UE is performed/aperiodic SRS transmission timing set to corresponding N bits may be indicated according to N bit values. For example, if N=2, SRS transmission may be dropped when the values of N bits are 00 and SRS transmission may be performed at timings 1/2/3 when the values of N bits are 01/10/11, respectively. Here, SRS timing may be identified by an SF and/or a symbol index.

Alternatively, SRS transmission of different resources may be triggered through N bits or SRS transmission based on a combination of different resources and transmission timings may be triggered through N bits with timing fixed. In addition, whether SRS transmission is performed and/or resources may be independently triggered per UE through 1 or N UE-specifically allocated bit or bits, and SRS transmission timing may be commonly set for all UEs through M UE-commonly allocated bits (M>1). Alternatively, in a state in which a plurality of SRS transmission resource candidates and a plurality of SRS transmission timing candidates have been previously set through higher layer signaling (e.g., RRC signaling), a resource candidate and a timing candidate to be used for SRS transmission may be indicated through UE-specific signaling (e.g., DCI). Alternatively, the method of indicating one of a plurality of candidates may be applied to only one of the SRS transmission resources and timings and the other may be fixed to a deterministic value.

Alternatively, when specific UE-common signaling has been successfully detected, the UE may operate on the assumption that SRS transmission has been triggered all the time. In this case, a bit constituting the UE-common signaling may indicate an SRS transmission resource and/or an SRS transmission timing, and the SRS transmission resource and/or timing may be indicated by a UE-specific value per UE (e.g., in the case of resource) or indicated by a UE-common value commonly for all UEs (e.g., in the case of timing).

UE-common DCI (SRS-trigger DCI for convenience) may be configured such that the UE-common DCI is transmitted/detected through an aperiodic SRS transmission cell or a PDCCH CSS on a cell configured to cross-CC schedule the corresponding cell. Further, a specific PDCCH candidate (PC) index of a specific CCE aggregation level (AL) may be allocated for SRS-trigger DCI. In addition, a UE-common RNTI dedicated for SRS-trigger DCI may be allocated. For example, when cases in which the first PC indices of CCE AL 4/8 are allocated for SF-config DCI transmission are considered (a total of two cases), 1) the second PC indices (a total of two indices) of CCE AL 4/8 and 2) the third PC index of CCE AL 4 and the second PC index of CCE AL 8 may be allocated for SRS-trigger DCI transmission. SRS-trigger DCI and UE-specific DCI carrying a DL/UL grant may indicate different contents while indicating whether aperiodic SRS transmissions at the same timing are transmitted. In this case, the UE may 1) conform to the contents indicated by the UE-specific DCI carrying the DL/UL grant or 2) conform to the contents indicated by most recently detected DCI.

Alternatively, when specific fields in a UE-specific DCI format carrying a DL/UL grant are set to a combination of specific values, only aperiodic SRS transmission may be indicated/performed without DL/UL-SCH TB (Transport Block) transmission. For example, in a state in which aperiodic SRS transmission has been indicated through DL/UL grant DCI, when a combination of a specific MCS (Modulation and Coding Scheme) index, a specific RV (Redundancy Version) index and/or a specific RA (Resource Allocation) field value is set in the DCI, the UE may perform only aperiodic SRS transmission without DL/UL-SCH TB transmission. For example, the combination of specific field values may be set to case 1) in which a code rate based on an MCS/RA combination exceeds a specific level, case 2) in which the quantity of resources allocated through RA is equal to or less than a specific level and the MCS index exceeds a specific value and case 3) in which the RV index is indicated by a specific value in addition to the condition of case 2.

Additionally, a method of simultaneously triggering aperiodic CSI feedback transmissions of a plurality of UEs through specific UE-common signaling (CSI-trigger DCI for convenience) may be considered. For example, in a state in which each bit in a specific DCI format (e.g., DCI format 3/3A) is set to be used to indicate whether aperiodic CSI feedback transmission of an individual UE is performed (and CSI feedback transmission resources (e.g., PUSCH or PUCCH resources) and a timing delay between a triggering time and a CSI transmission time), whether aperiodic CSI transmission of a UE is performed, which is set to the corresponding bit, may be indicated according to the value of the bit (e.g., 0 or 1). For example, CSI transmission may be dropped when bit=0 and CSI transmission may be preformed when bit=1. Alternatively, in a state in which N different bits (N>1) in DCI are set to be used to indicate whether aperiodic CSI feedback transmission of an individual UE is performed/aperiodic CSI feedback transmission timing, whether aperiodic CSI feedback transmission of a UE is performed/aperiodic CSI feedback transmission timing set to corresponding N bits may be indicated according to N bit values. For example, if N=2, CSI transmission may be dropped when the values of N bits are 00 and CSI transmission may be performed at timings 1/2/3 when the values of N bits are 01/10/11, respectively. Here, CSI transmission timing may be identified by an SF and/or a symbol index.

Alternatively, CSI transmission of different resources may be triggered through N bits or CSI transmission based on a combination of different resources and transmission timings may be triggered through N bits with timing fixed. In addition, whether CSI transmission is performed and/or resources may be independently triggered per UE through 1 or N UE-specifically allocated bit or bits, and CSI transmission timing may be commonly set for all UEs through M UE-commonly allocated bits (M>1). Meanwhile, CSI-trigger DCI and UE-specific DCI carrying a DL/UL grant may indicate different contents while indicating whether aperiodic CSI transmissions at the same timing are transmitted. In this case, the UE may 1) conform to the contents indicated by the UE-specific DCI carrying the DL/UL grant or 2) conform to the contents indicated by most recently detected DCI. Alternatively, in a state in which a plurality of CSI transmission resource candidates and a plurality of CSI transmission timing candidates have been previously set through higher layer signaling (e.g., RRC signaling), a resource candidate and a timing candidate to be used for CSI transmission may be indicated through UE-specific signaling (e.g., DCI). Alternatively, the method of indicating one of a plurality of candidates may be applied to only one of the CSI transmission resources and timings and the other may be fixed to a deterministic value.

Alternatively, when specific UE-common signaling has been successfully detected, the UE may operate on the assumption that CSI feedback transmission has been triggered all the time. In this case, a bit constituting the UE-common signaling may indicate a CSI transmission resource (e.g., a PUCCH) and/or a CSI transmission timing, and the CSI transmission resource and/or timing may be indicated by a UE-specific value per UE (e.g., in the case of resource) or indicated by a UE-common value commonly for all UEs (e.g., in the case of timing).

In addition, similarly to the above-described method, a method of simultaneously triggering HARQ-ACK (A/N) feedback transmissions (for DL data reception at a specific time) of a plurality of UEs through specific UE-common signaling may be considered. For example, in a state in which each bit in a specific DCI format (e.g., DCI format 3/3A) is set to be used to indicate whether A/N feedback transmission of an individual UE is performed (and a PUSCH or PUCCH resource and a timing delay between a triggering time and an A/N transmission time), whether A/N feedback transmission of a UE is performed, which is set to a corresponding bit, may be indicated according to the value of the corresponding bit (e.g., 0 or 1). For example, A/N transmission may be dropped when bit=0 and A/N transmission may be preformed when bit=1. Alternatively, in a state in which N different bits (N>1) in DCI are set to be used to indicate whether A/N feedback transmission of an individual UE is performed/A/N feedback transmission timing, whether A/N feedback transmission of a UE is performed/A/N feedback transmission timing set to N corresponding bits may be indicated according to N bit values. For example, if N=2, A/N transmission may be dropped when the values of N bits are 00 and A/N transmission may be performed at timings 1/2/3 when the value of N bits is 01/10/11, respectively. Here, A/N timing may be identified by an SF and/or a symbol index.

Alternatively, A/N transmission of different resources may be triggered through N bits or A/N transmission based on a combination of different resources and transmission timings may be triggered through N bits, with timing fixed. In addition, whether A/N transmission is performed and/or resources may be independently triggered per UE through UE-specifically allocated 1 bit or N bits, and A/N transmission timing may be commonly set for all UEs through UE-commonly allocated M bits (M>1). Alternatively, in a state in which a plurality of A/N transmission resource candidates and a plurality of A/N transmission timing candidates have been previously set through higher layer signaling (e.g., RRC signaling), a resource candidate and a timing candidate to be used for A/N transmission may be indicated through UE-specific signaling (e.g., DCI). Alternatively, the method of indicating one of a plurality of candidates may be applied to only one of the A/N transmission resources and timings and the other may be fixed to a deterministic value.

Alternatively, when specific UE-common signaling has been successfully detected, the UE may operate on the assumption that A/N transmission has been triggered all the time. In this case, a bit constituting the UE-common signaling may indicate an A/N transmission resource (e.g., a PUCCH) and/or an A/N transmission timing, and the A/N transmission resource and/or timing may be indicated by a UE-specific value per UE (e.g., in the case of resource) or indicated by a UE-common value commonly for all UEs (e.g., in the case of timing).

Additionally, a method of simultaneously triggering PRACH signal transmissions of a plurality of UEs through specific UE-common signaling (PRACH-trigger DCI for convenience) may be considered. For example, in a state in which each bit in a specific DCI format (e.g., DCI format 3/3A) is set to be used to indicate whether PRACH signal transmission of an individual UE is performed (and PRACH transmission resources (e.g., time/code/frequency resources or PRACH preamble index) and a timing delay between a triggering time and a PRACH transmission time), whether PRACH signal transmission of a UE is performed, which is set to a corresponding bit, may be indicated according to the value of the corresponding bit (e.g., 0 or 1). For example, PRACH transmission may be dropped when bit=0 and PRACH transmission may be preformed when bit=1. Alternatively, in a state in which N different bits (N>1) in DCI are set to be used to indicate whether PRACH transmission of an individual UE is performed/PRACH transmission timing, whether PRACH transmission of a UE is performed/ PRACH transmission timing set to corresponding N bits may be indicated according to N bit values. For example, if N=2, PRACH transmission may be dropped when the values of N bits are 00 and PRACH transmission may be performed at timings 1/2/3 when the values of N bits are 01/10/11, respectively. Here, PRACH transmission timing may be identified by an SF and/or a symbol index.

Alternatively, PRACH transmission of different resources may be triggered through N bits or PRACH transmission based on a combination of different resources and transmission timings may be triggered through N bits with timing fixed. In addition, whether PRACH transmission is performed and/or resources may be independently triggered per UE through 1 or N UE-specifically allocated bit or bits, and PRACH transmission timing may be commonly set for all UEs through M UE-commonly allocated bits (M>1). Meanwhile, PRACH-trigger DCI and UE-specific DCI carrying a PDCCH order may indicate different contents while indicating whether PRACH transmissions at the same timing are transmitted. In this case, the UE may 1) conform to the contents indicated by the UE-specific DCI carrying the PDCCH order or 2) conform to the contents indicated by most recently detected DCI. Alternatively, in a state in which a plurality of PRACH transmission resource candidates and a plurality of PRACH transmission timing candidates have been previously set through higher layer signaling (e.g., RRC signaling), a resource candidate and a timing candidate to be used for PRACH transmission may be indicated through UE-specific signaling (e.g., DCI). Alternatively, the method of indicating one of a plurality of candidates may be applied to only one of the PRACH transmission resources and timings and the other may be fixed to a deterministic value.

Alternatively, when specific UE-common signaling has been successfully detected, the UE may operate on the assumption that PRACH transmission has been triggered all the time. In this case, a bit constituting the UE-common signaling may indicate a PRACH transmission resource (e.g., a PUCCH) and/or a PRACH transmission timing, and the PRACH transmission resource and/or timing may be indicated by a UE-specific value per UE (e.g., in the case of resource) or indicated by a UE-common value commonly for all UEs (e.g., in the case of timing).

In addition, similarly to the above-described method, a method of simultaneously triggering DL CSI measurement RS (CSI-RS) transmissions of a plurality of UEs through specific UE-common signaling may be considered. For example, in a state in which each bit in a specific DCI format (e.g., DCI format 3/3A) is set to be used to indicate whether CSI-RS transmission of an individual UE is performed (and CSI-RS signal transmission resources (e.g., time/code/frequency resources) and a timing delay between a triggering time and a CSI-RS transmission time), whether CSI-RS transmission of a UE is performed, which is set to the corresponding bit, may be indicated according to the value of the bit (e.g., 0 or 1). For example, CSI-RS transmission may be dropped when bit=0 and CSI-RS transmission may be performed when bit=1. Alternatively, in a state in which N different bits (N>1) in DCI are set to be used to indicate whether CSI-RS transmission of an individual UE is performed/CSI-RS transmission timing, whether CSI-RS transmission of a UE is performed/CSI-RS transmission timing set to N corresponding bits may be indicated according to N bit values. For example, if N=2, CSI-RS transmission may be dropped when the values of N bits are 00 and CSI-RS transmission may be performed at timings 1/2/3 when the values of N bits are 01/10/11, respectively. Here, CSI-RS transmission timing may be identified by an SF and/or a symbol index.

Alternatively, CSI-RS transmission of different resources may be triggered through N bits or CSI-RS transmission based on a combination of different resources and transmission timings may be triggered through N bits with timing fixed. In addition, whether CSI-RS transmission is performed and/or resources may be independently triggered per UE through 1 or N UE-specifically allocated bit or bits, and CSI-RS transmission timing may be commonly set for all UEs through M UE-commonly allocated bits (M>1). Alternatively, in a state in which a plurality of CSI-RS transmission resource candidates and a plurality of CSI-RS transmission timing candidates have been previously set through higher layer signaling (e.g., RRC signaling), a resource candidate and a timing candidate to be used for CSI-RS transmission may be indicated through UE-common signaling or UE-specific signaling (e.g., DCI). Alternatively, the method of indicating one of a plurality of candidates may be applied to only one of the CSI-RS transmission resources and timings and the other may be fixed to a deterministic value.

Alternatively, when specific UE-common signaling has been successfully detected, the UE may operate on the assumption that CSI-RS transmission has been triggered all the time. In this case, a bit constituting the UE-common signaling may indicate a CSI-RS transmission resource and/or a CSI-RS transmission timing, and the CSI-RS transmission resource and/or timing may be indicated by a UE-specific value per UE (e.g., in the case of resource) or indicated by a UE-common value commonly for all UEs (e.g., in the case of timing).

(5) UE-Common Signaling Based Aperiodic SR Transmission Method

As a method of indicating/performing SR transmission for a UL data transmission resource scheduling request, a method of simultaneously triggering SR (e.g., positive SR or negative SR) of a plurality of UEs through specific UE-common signaling (in an aperiodic manner) may be considered. For example, in a state in which each bit in a specific DCI format (e.g., DCI format 3/3A) is set to be used to indicate whether SR feedback transmission of an individual UE is performed (and corresponding SR transmission resources (e.g., PUCCH resource) and a timing delay between a triggering time and an SR transmission time), whether SR transmission of a UE is performed, which is set to the corresponding bit, may be indicated according to the value of each bit (e.g., 0 or 1). For example, SR transmission may be dropped when bit=0 and SR transmission may be performed when bit=1. Alternatively, in a state in which N different bits (N>1) in DCI are set to be used to indicate whether SR transmission of an individual UE is performed/SR transmission timing, whether SR transmission of a UE is performed/SR transmission timing set to N corresponding bits may be indicated according to N bit values. For example, if N=2, SR transmission may be dropped when the values of N bits are 00 and SR transmission may be performed at timings 1/2/3 when the values of N bits are 01/10/11, respectively. Here, SR timing may be identified by an SF and/or a symbol index.

Alternatively, SR transmission of different resources may be triggered through N bits or SR transmission based on a combination of different resources and transmission timings may be triggered through N bits with timing fixed. In addition, whether SR transmission is performed and/or resources may be independently triggered per UE through 1 or N UE-specifically allocated bit or bits, and SR transmission timing may be commonly set for all UEs through M UE-commonly allocated bits (M>1). Alternatively, in a state in which a plurality of SR transmission resource candidates and a plurality of SR transmission timing candidates have been previously set through higher layer signaling (e.g., RRC signaling), a resource candidate and a timing candidate to be used for SR transmission may be indicated through UE-specific signaling (e.g., DCI). Alternatively, the method of indicating one of a plurality of candidates may be applied to only one of the SR transmission resources and timings and the other may be fixed to a deterministic value.

Alternatively, when specific UE-common signaling has been successfully detected, the UE may operate on the assumption that SR transmission has been triggered all the time. In this case, a bit constituting the UE-common signaling may indicate an SRS transmission resource (e.g., PUCCH) and/or an SR transmission timing, and the SR transmission resource and/or timing may be indicated by a UE-specific value per UE (e.g., in the case of resource) or indicated by a UE-common value commonly for all UEs (e.g., in the case of timing).

Alternatively, a method of enabling/disabling SR transmission such that a UE periodically performs SR transmission within a specific time duration through specific signaling may also be considered. Specifically, the UE may operate to perform SR transmission in a specific period until a disable signal is received upon reception of an enable signal. The SR transmission period may be directly indicated through the enable signal and information about a time duration in which (periodic) SR transmission is permitted may be additionally included in the enable signal (in this case, additional disable signal transmission may be dropped).

With respect to CSI-RS transmission from a BS, a method of enabling/disabling CSI-RS transmission such that CSI-RS transmission from the BS is periodically performed within a specific time duration through specific signaling may also be considered. Specifically, the UE may operate to perform CSI-RS reception (and related operation) in a specific period until a disable signal is received upon reception of an enable signal. The CSI-RS transmission period (and/or CSI-RS transmission resource related information) may be directly indicated through the enable signal and information about a time duration in which (periodic) CSI-RS transmission is transmitted may be additionally included in the enable signal (in this case, additional disable signal transmission may be dropped).

Furthermore, with respect to CSI feedback transmission of the UE, a method of enabling/disabling CSI transmission such that the UE periodically performs CSI feedback transmission within a specific time duration through specific signaling may also be considered. Specifically, the UE may operate to perform CSI feedback transmission in a specific period until a disable signal is received upon reception of an enable signal. The CSI feedback transmission period may be directly indicated through the enable signal and information about a time duration in which (periodic) CSI transmission is permitted may be additionally included in the enable signal (in this case, additional disable signal transmission may be dropped).

In addition, with respect to SRS transmission, a method of enabling/disabling SRS transmission such that the UE periodically performs SRS transmission within a specific time duration through specific signaling may also be considered. Specifically, the UE may operate to perform SRS transmission in a specific period until a disable signal is received upon reception of an enable signal. The SRS transmission period may be directly indicated through the enable signal and information about a time duration in which (periodic) SRS transmission is permitted may be additionally included in the enable signal (in this case, additional disable signal transmission may be dropped).

The present invention is applicable to LCells operating on the basis of contention (between UEs) involving CCA (or specific signal detection) and/or UCells operating without CCA execution as well as UCells operating on the basis of CCA. In addition, the present invention is applicable to TDD systems operating on the basis of dynamically reconfigured/indicated DL/UL subframe configurations without depending on fixed/semi-fixed DL/UL subframe configurations (while operating without additional CCA execution). Furthermore, DL grant DCI may be applied instead of a specific signal (e.g., PDCCH) UE-commonly transmitted through a DL SF on a UCell.

Figure 16:
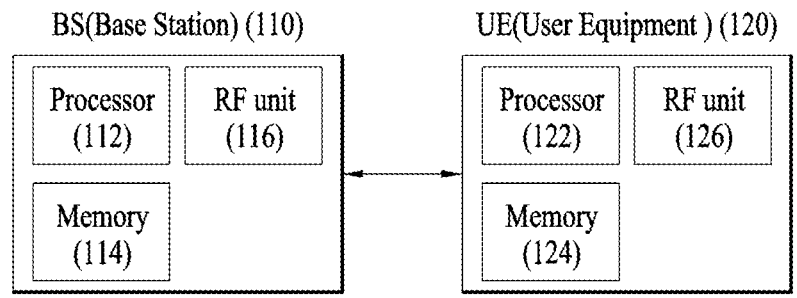
FIG. 16 illustrates a base station and a user equipment applicable to an embodiment of the present invention.

FIG. 16 illustrates a BS and a UE of a wireless communication system, which are applicable to embodiments of the present invention.

Referring to FIG. 16, the wireless communication system includes a BS 110 and a UE 120. When the wireless communication system includes a relay, the BS or UE may be replaced by the relay.

The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The present invention is applicable to UEs, eNBs or other apparatuses of a wireless mobile communication system.

What is claimed is:

1. A method performed by a user equipment (UE) configured to operate in a wireless communication system, the method comprising:
   receiving a radio resource control (RRC) signal comprising first information related to a plurality of hybrid automatic repeat and request (HARQ) processes;
   receiving downlink control information (DCI) scheduling a physical downlink shared channel (PDSCH), wherein the DCI comprises a first indication related to at least one HARQ process among the plurality of HARQ processes;
obtaining an acknowledgement/negative acknowledgement (A/N) payload comprising a plurality of A/N bits corresponding to all of the at least one HARQ process indicated by the first information, wherein an A/N bit among the A/N bits for a HARQ process among the at least one HARQ process is determined by:
based on an A/N result for the HARQ process having not been reported for the PDSCH, the A/N bit is determined as the A/N result for the HARQ process, and
based on the A/N result for the HARQ process having been reported for the PDSCH, the A/N bit is determined as NACK;
obtaining HARQ-acknowledgement (HARQ-ACK) information based on the A/N payload; and
reporting the HARQ-ACK information.

2. The method of claim 1, wherein the RRC signal further comprises second information related to a plurality of serving cells,
wherein the DCI further comprises a second indication related to at least one serving cell among the plurality of serving cells, and
wherein the HARQ-ACK information is obtained based on (i) the at least one HARQ process indicated by the first indication and (ii) the at least one serving cell identified by the second indication.

3. The method of claim 1, wherein, based on the A/N result for the HARQ process having been reported for the PDSCH, the A/N bit is determined as NACK, regardless of the A/N result for the HARQ process.

4. The method of claim 1, wherein the HARQ-ACK is reported in one of a physical uplink control channel (PUCCH) or a physical uplink shared channel (PUSCH).

5. A user equipment (UE) configured to operate in a wireless communication system, the UE comprising:
a transceiver;
at least one processor coupled with the transceiver; and
at least one computer memory operably connectable to the at least one processor and storing instructions that, when executed by the at least one processor, perform operations comprising:
receiving a radio resource control (RRC) signal comprising first information related to a plurality of hybrid automatic repeat and request (HARQ) processes;
receiving downlink control information (DCI) scheduling a physical downlink shared channel (PDSCH), wherein the DCI comprises a first indication related to at least one HARQ process among the plurality of HARQ processes;
obtain an acknowledgement/negative acknowledgement (A/N) payload comprising a plurality of A/N bits corresponding to all of the at least one HARQ process indicated by the first information, wherein an A/N bit among the A/N bits for a HARQ process among the at least one HARQ process is determined by:
based on an A/N result for the HARQ process having not been reported for the PDSCH, the A/N bit is determined as the A/N result for the HARQ process, and
based on the A/N result for the HARQ process having been reported for the PDSCH, the A/N bit is determined as NACK;
obtaining HARQ-acknowledgement (HARQ-ACK) information based on the A/N payload; and
reporting the HARQ-ACK information.

6. The UE of claim 5, wherein the RRC signal further comprises second information related to a plurality of serving cells,
wherein the DCI further comprises a second indication related to at least one serving cell among the plurality of serving cells, and
wherein the HARQ-ACK information is obtained based on (i) the at least one HARQ process indicated by the first indication and (ii) the at least one serving cell identified by the second indication.

7. The UE of claim 5, wherein, based on the A/N result for the HARQ process having been reported for the PDSCH, the A/N bit is determined as NACK, regardless of the A/N result for the HARQ process.

8. The UE of claim 5, wherein the HARQ-ACK is reported in one of a physical uplink control channel (PUCCH) or a physical uplink shared channel (PUSCH).

9. A method performed by a base station configured to operate in a wireless communication system, the method comprising:
transmitting a radio resource control (RRC) signal comprising first information related to a plurality of hybrid automatic repeat and request (HARQ) processes;
transmitting downlink control information (DCI) scheduling a physical downlink shared channel (PDSCH), wherein the DCI comprises a first indication related to at least one HARQ process among the plurality of HARQ processes; and
receiving HARQ-acknowledgement (HARQ-ACK) information,
wherein the HARQ-ACK information is based on an acknowledgement/negative acknowledgement (A/N) payload,
wherein the A/N payload comprises a plurality of A/N bits corresponding to all of the at least one HARQ process indicated by the first information,
wherein an A/N bit among the A/N bits for a HARQ process among the at least one HARQ process is determined by:
based on an A/N result for the HARQ process having not been reported for the PDSCH, the A/N bit is determined as the A/N result for the HARQ process, and
based on the A/N result for the HARQ process having been reported for the PDSCH, the A/N bit is determined as NACK.

10. A base station configured to operate in a wireless communication system, the base station comprising:
a transceiver;
at least one processor coupled with the transceiver; and
at least one computer memory operably connectable to the at least one processor and storing instructions that, when executed by the at least one processor, perform operations comprising:
transmitting a radio resource control (RRC) signal comprising first information related to a plurality of hybrid automatic repeat and request (HARQ) processes;
transmitting downlink control information (DCI) scheduling a physical downlink shared channel (PDSCH), wherein the DCI comprises a first indication related to at least one HARQ process among the plurality of HARQ processes; and
receive HARQ-acknowledgement (HARQ-ACK) information, wherein the HARQ-ACK information is based on an acknowledgement/negative acknowledgement (A/N) payload, wherein the A/N payload comprises a plurality of A/N bits corresponding to all of the at least one HARQ process indicated by the first information, wherein an A/N bit among the A/N bits for a HARQ process among the at least one HARQ process is determined by:

based on an A/N result for the HARQ process having not been reported for the PDSCH, the A/N bit is determined as the A/N result for the HARQ process, and based on the A/N result for the HARQ process having been reported for the PDSCH, the A/N bit is determined as NACK.

11. A method performed by a user equipment (UE) in a wireless communication system, the method comprising:

receiving downlink control information (DCI) for scheduling a physical downlink channel (PDSCH), wherein the DCI comprises delay information related to acknowledgement/negative acknowledgement (A/N) timing;

based on receiving the DCI, receiving data via the PDSCH in a time unit n; and based on receiving the data in the time unit n, transmitting an A/N payload in a time unit n+k, where k is one of a plurality of A/N timing values and k is based on the received delay information, wherein the A/N payload comprises a plurality of A/N responses, with the plurality of A/N responses related to a plurality of data reception occasions, and wherein the plurality of data reception occasions, related to the plurality of A/N responses in the A/N payload, are determined based on the plurality of A/N timing values.

12. The method of claim 11, wherein each of the plurality of data reception occasions is related to a respective time unit $n_i$, and wherein $n_i$ is an $i^{th}$ element of a timing set that comprises the time unit n.

13. The method of claim 11, wherein each time unit comprises a plurality of contiguous orthogonal frequency division multiplexing (OFDM)-based symbols.

14. The method of claim 11, wherein the DCI is received through a physical downlink control channel (PDCCH), and wherein the A/N payload is transmitted through a physical uplink control channel (PUCCH) or a physical uplink shared channel (PUSCH).

15. A user equipment (UE) configured to operate in a wireless communication system, the UE comprising:

at least one processor; and at least one computer memory operably connectable to the at least one processor and storing instructions that, when executed by the at least one processor, perform operations comprising:

receiving downlink control information (DCI) for scheduling a physical downlink channel (PDSCH), wherein the DCI comprises delay information related to acknowledgement/negative acknowledgement (A/N) timing;

based on receiving the DCI, receiving data via the PDSCH in a time unit n; and based on receiving the data in the time unit n, transmitting an A/N payload in a time unit n+k, where k is one of a plurality of A/N timing values and k is based on the received delay information, wherein the A/N payload comprises a plurality of A/N responses, with the plurality of A/N responses related to a plurality of data reception occasions, and wherein the plurality of data reception occasions, related to the plurality of A/N responses in the A/N payload, are determined based on the plurality of A/N timing values.

16. The UE of claim 15, wherein each of the plurality of data reception occasions is related to a respective time unit $n_i$, and wherein $n_i$ is an $i^{th}$ element of a timing set that comprises the time unit n.

17. The UE of claim 15, wherein each time unit comprises a plurality of contiguous orthogonal frequency division multiplexing (OFDM)-based symbols.

18. The UE of claim 15, wherein the DCI is received through a physical downlink control channel (PDCCH), and wherein the A/N payload is transmitted through a physical uplink control channel (PUCCH) or a physical uplink shared channel (PUSCH).

* * * * *